United States Patent
Kumar et al.

(10) Patent No.: US 11,811,671 B2
(45) Date of Patent: Nov. 7, 2023

(54) TECHNIQUES FOR REDUCING A FEEDBACK TIME FOR COMMUNICATIONS OVER MULTIPLE WIRELESS CONNECTIONS

(71) Applicant: QUALCOMM Incorporated, San Diego, CA (US)

(72) Inventors: Akshay Kumar, San Diego, CA (US); Arnaud Meylan, San Diego, CA (US); Shailesh Maheshwari, San Diego, CA (US); Arun Prasanth Balasubramanian, San Diego, CA (US); Utpal Barman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/367,313

(22) Filed: Jul. 2, 2021

(65) Prior Publication Data
US 2023/0006940 A1    Jan. 5, 2023

(51) Int. Cl.
*H04L 47/34* (2022.01)
*H04W 76/15* (2018.01)
(Continued)

(52) U.S. Cl.
CPC ............... *H04L 47/34* (2013.01); *H04L 1/08* (2013.01); *H04L 5/0053* (2013.01); *H04W 76/15* (2018.02)

(58) Field of Classification Search
CPC ......... H04L 47/34; H04L 1/08; H04L 5/0053; H04W 76/15
See application file for complete search history.

(56) References Cited

U.S. PATENT DOCUMENTS

2008/0045272 A1*  2/2008  Wang ................... H04L 5/0094
                                                   370/329
2009/0073872 A1*  3/2009  Hans .................... H04L 9/40
                                                   370/216
(Continued)

FOREIGN PATENT DOCUMENTS

EP          3435576 A1     1/2019
KR       20080099779 A    11/2008
(Continued)

OTHER PUBLICATIONS

International Search Report and Written Opinion—PCT/US2022/034776—ISA/EPO—dated Oct. 19, 2022.

*Primary Examiner* — Ajit Patel
*Assistant Examiner* — Wilfred Thomas
(74) *Attorney, Agent, or Firm* — Holland & Hart LLP

(57) ABSTRACT

Methods, systems, and devices for wireless communication are described to support entering a fast-negative acknowledgement (NACK) mode. A user equipment (UE) may enter a fast-NACK mode and may decrease a value of a respective timer for one or more wireless connections (e.g., may override the timer independently for each connection). The timer may be referred to as a retransmission request time duration. If configured with two or more component carriers (CCs), the UE may determine a value of the timer based on a location of a data hole within the two or more CCs. Based on entering the fast-NACK mode, the UE may override a configured timer for the respective wireless connection with a new, shorter timer. Based on expiration of the new timer, the UE may transmit an RLC NACK to a base station via the corresponding wireless connection.

28 Claims, 13 Drawing Sheets

(51) Int. Cl.
*H04L 1/08* (2006.01)
*H04L 5/00* (2006.01)

(56) References Cited

U.S. PATENT DOCUMENTS

| | | | |
|---|---|---|---|
| 2010/0105334 A1 | 4/2010 | Terry et al. | |
| 2012/0099525 A1* | 4/2012 | Maheshwari | H04W 12/041 |
| | | | 370/328 |
| 2013/0034014 A1* | 2/2013 | Jonsson | H04W 24/10 |
| | | | 370/253 |
| 2013/0039208 A1* | 2/2013 | Jonsson | H04W 56/0055 |
| | | | 370/252 |
| 2016/0315736 A1* | 10/2016 | Dwarakanath | H04W 24/04 |
| 2017/0078890 A1* | 3/2017 | Zhu | H04W 8/08 |
| 2017/0094568 A1* | 3/2017 | Yang | H04W 48/16 |
| 2018/0241509 A1 | 8/2018 | Phuyal et al. | |
| 2018/0332501 A1 | 11/2018 | Tseng et al. | |
| 2019/0230681 A1* | 7/2019 | Han | H04W 76/12 |
| 2021/0007008 A1 | 1/2021 | Gage | |
| 2021/0105663 A1 | 4/2021 | Kim | |
| 2021/0359794 A1* | 11/2021 | Yang | H04L 5/0055 |
| 2022/0085939 A1 | 3/2022 | Mondal et al. | |
| 2022/0116819 A1 | 4/2022 | Deng | |
| 2022/0174646 A1* | 6/2022 | Lee | H04L 1/1893 |

FOREIGN PATENT DOCUMENTS

| | | | | |
|---|---|---|---|---|
| WO | WO-2019006945 A1 | | 1/2019 | |
| WO | WO-2019080814 A1 | * | 5/2019 | H04L 1/18 |
| WO | WO-2021178241 A1 | | 9/2021 | |

* cited by examiner

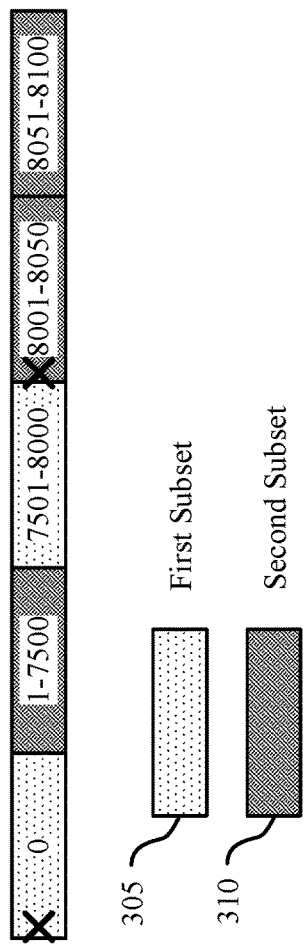
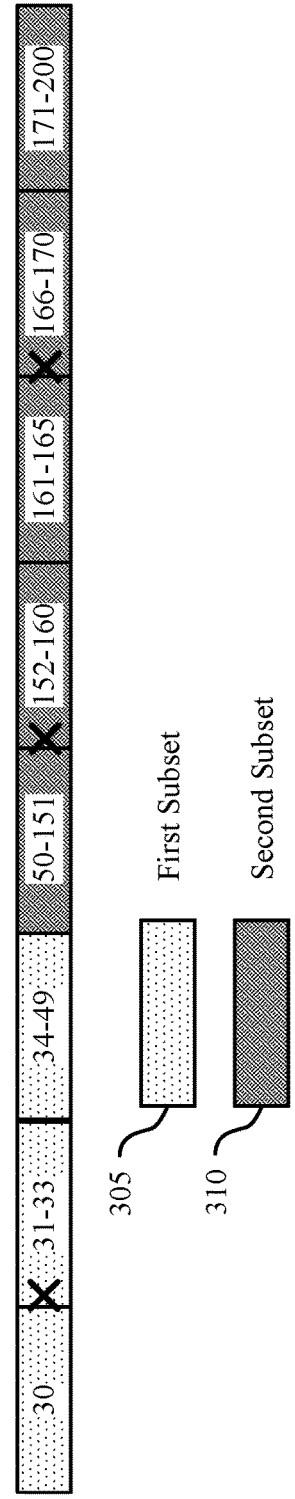
FIG. 3A
FIG. 3B

TECHNIQUES FOR REDUCING A FEEDBACK TIME FOR COMMUNICATIONS OVER MULTIPLE WIRELESS CONNECTIONS

FIELD OF TECHNOLOGY

The following relates to wireless communication, including techniques for reducing a feedback time for communications over multiple wireless connections.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may operate over one or more wireless connections, which may share a same buffer. The buffer may, for example, store a number of received packets for the wireless connections, and some downlink throughput may be lost if retransmission of missed packets are not received before the buffer is flushed.

SUMMARY

The described techniques relate to improved methods, systems, devices, and apparatuses that support techniques for reducing a feedback time for communications over multiple wireless connections. Generally, the described techniques provide for entering a fast-negative acknowledgement (NACK) mode. For example, a user equipment (UE) may enter a fast-NACK mode and may decrease a value of a respective radio link control (RLC) timer for one or more wireless connections (e.g., may decrease the RLC timer independently for each connection). In some cases, the RLC timer (e.g., or a value thereof) may be referred to as a retransmission request time duration. Decreasing the RLC timer may be referred to as entering a fast-NACK mode, and may result in requesting retransmission of any missed packets earlier. In some cases, the UE may additionally, or alternatively, be configured with two or more component carriers (CCs) for a same wireless connection, and may determine a value of the decreased RLC timer based on a respective numerology for one or more of the CCs that may be associated with a missed packet. The UE may determine to enter the fast-NACK mode for one or both of the wireless connections. Based on entering the fast-NACK mode, the UE may override a configured RLC timer for the respective wireless connection with a new, shorter timer. Based on expiration of the new timer, the UE may transmit an RLC NACK to a base station via the corresponding wireless connection.

A method for wireless communications at a UE is described. The method may include receiving, for a first connection, first control signaling indicating a first retransmission request time duration for requesting packet retransmission relative to when a packet in a first subset of a sequence of packets is determined to be unsuccessfully received via the first connection, receiving, for a second connection, second control signaling indicating a second retransmission request time duration for requesting packet retransmission relative to when a packet in a second subset of the sequence of packets is determined to be unsuccessfully received via the second connection, and transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

An apparatus for wireless communications at a UE is described. The apparatus may include a processor, memory coupled with the processor, and instructions stored in the memory. The instructions may be executable by the processor to cause the apparatus to receive, for a first connection, first control signaling indicating a first retransmission request time duration for requesting packet retransmission relative to when a packet in a first subset of a sequence of packets is determined to be unsuccessfully received via the first connection, receive, for a second connection, second control signaling indicating a second retransmission request time duration for requesting packet retransmission relative to when a packet in a second subset of the sequence of packets is determined to be unsuccessfully received via the second connection, and transmit, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

Another apparatus for wireless communications at a UE is described. The apparatus may include means for receiving, for a first connection, first control signaling indicating a first retransmission request time duration for requesting packet retransmission relative to when a packet in a first subset of a sequence of packets is determined to be unsuccessfully received via the first connection, means for receiving, for a second connection, second control signaling indicating a second retransmission request time duration for requesting packet retransmission relative to when a packet in a second subset of the sequence of packets is determined to be unsuccessfully received via the second connection, and means for transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

A non-transitory computer-readable medium storing code for wireless communications at a UE is described. The code may include instructions executable by a processor to receive, for a first connection, first control signaling indicating a first retransmission request time duration for requesting packet retransmission relative to when a packet in a first subset of a sequence of packets is determined to be unsuccessfully received via the first connection, receive, for a second connection, second control signaling indicating a second retransmission request time duration for requesting packet retransmission relative to when a packet in a second subset of the sequence of packets is determined to be unsuccessfully received via the second connection, and transmit, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

Some examples of the method, apparatuses, and non-transitory computer-readable medium described herein may further include operations, features, means, or instructions for determining that the first retransmission request time duration satisfies a threshold, where overriding the first retransmission request time duration may be based on the determining.

Some examples of the method, apparatuses, and non-transitory computer-readable medium described herein may further include operations, features, means, or instructions for determining a first reordering window length for the first subset of the sequence of packets and determining that the first reordering window length satisfies a first threshold associated with the first connection, where overriding the first retransmission request time duration with the third retransmission request time duration may be based on determining that the first reordering window length satisfies the first threshold.

In some examples of the method, apparatuses, and non-transitory computer-readable medium described herein, determining the first reordering window length may include operations, features, means, or instructions for identifying a first packet data convergence protocol (PDCP) sequence number corresponding to a highest radio link control sequence number for the sequence of packets and determining whether a second PDCP sequence number that includes a lowest missing PDCP sequence number from the first subset of the sequence of packets may be equal to the first PDCP sequence number plus one.

Some examples of the method, apparatuses, and non-transitory computer-readable medium described herein may further include operations, features, means, or instructions for determining that the second PDCP sequence number may be equal to the first PDCP sequence number plus one and setting the first reordering window length to a total reordering window length for the sequence of packets.

Some examples of the method, apparatuses, and non-transitory computer-readable medium described herein may further include operations, features, means, or instructions for determining that the second PDCP sequence number may be not a next PDCP sequence number following the first PDCP sequence number and setting the first reordering window length to a reordering window length including packets from the sequence of packets associated with sequence numbers greater than the second PDCP sequence number.

Some examples of the method, apparatuses, and non-transitory computer-readable medium described herein may further include operations, features, means, or instructions for determining the third retransmission request time duration based on a first offset and a product of an integer and a hybrid automatic repeat request (HARQ) round trip time (RTT) for the first connection, where the integer may be associated with a level of the third retransmission request time duration, and where overriding the first retransmission request time duration with the third retransmission request time duration may be based on determining the third retransmission request time duration.

Some examples of the method, apparatuses, and non-transitory computer-readable medium described herein may further include operations, features, means, or instructions for determining the first threshold based on an available reordering window for the sequence of packets, a retransmission request processing duration, a HARQ RTT for the first connection, or a combined throughput for the first connection and the second connection, where determining that the first reordering window length satisfies the first threshold may be based on determining the first threshold.

In some examples of the method, apparatuses, and non-transitory computer-readable medium described herein, determining the first threshold may include operations, features, means, or instructions for determining the first threshold based on an integer multiple of the HARQ RTT.

In some examples of the method, apparatuses, and non-transitory computer-readable medium described herein, determining the first threshold may include operations, features, means, or instructions for determining the first threshold for a first data radio bearer (DRB) of the first connection, where the first reordering window length corresponds to the first DRB, and where the combined throughput may be equal to a throughput for one or more DRBs for the first connection and the second connection that excludes a throughput for one or more second DRBs associated with an unacknowledged mode.

Some examples of the method, apparatuses, and non-transitory computer-readable medium described herein may further include operations, features, means, or instructions for determining the available reordering window for the sequence of packets based on an average throughput for each of the one or more DRBs divided by the throughput for the one or more DRBs and a reordering window that excludes packets associated with one or more unacknowledged mode DRBs for the first connection and the second connection, where determining the first threshold may be based on determining the available reordering window.

In some examples of the method, apparatuses, and non-transitory computer-readable medium described herein, determining the first threshold may include operations, features, means, or instructions for determining the first threshold for a first subscription of the first connection, where the first reordering window length corresponds to the first DRB and the first subscription.

In some examples of the method, apparatuses, and non-transitory computer-readable medium described herein, determining the available reordering window may include operations, features, means, or instructions for determining the available reordering window for the sequence of packets based on an offset associated with a dedicated data subscription, an average throughput for each of the one or more DRBs divided by the throughput for the one or more DRBs, a reordering window independent of one or more unacknowledged mode DRBs for the first connection and the second connection, or a throughput for the first subscription divided by a combined throughput for the first subscription and one or more other subscriptions, where determining the first threshold may be based on determining the available reordering window.

Some examples of the method, apparatuses, and non-transitory computer-readable medium described herein may further include operations, features, means, or instructions for setting a time duration for transmitting a next retransmission request for the first connection to the third retransmission request time duration based on overriding the first retransmission request time duration with the third retransmission request time duration.

Some examples of the method, apparatuses, and non-transitory computer-readable medium described herein may further include operations, features, means, or instructions for performing a tune-away procedure for the second connection and reverting to the first retransmission request time duration for the first connection based on performing the tune-away procedure for the second connection.

Some examples of the method, apparatuses, and non-transitory computer-readable medium described herein may further include operations, features, means, or instructions for performing a tune-away procedure for the second connection and disabling retransmission requests that use a retransmission request time duration for the first connection based on performing the tune-away procedure for the second connection.

Some examples of the method, apparatuses, and non-transitory computer-readable medium described herein may further include operations, features, means, or instructions for determining to override the second retransmission request time duration with a fourth retransmission request time duration for the second connection and transmitting, prior to expiration of the second retransmission request time duration, a second retransmission request to request retransmission of at least one packet in the second subset of the sequence of packets based on determining to override the second retransmission request time duration with the fourth retransmission request time duration.

Some examples of the method, apparatuses, and non-transitory computer-readable medium described herein may further include operations, features, means, or instructions for determining that the third retransmission request time duration may have expired based on overriding the first retransmission request time duration with the third retransmission request time duration and restarting the third retransmission request time duration based on an arrival of a next packet in the sequence of packets via the first connection.

Some examples of the method, apparatuses, and non-transitory computer-readable medium described herein may further include operations, features, means, or instructions for determining that the third retransmission request time duration may have expired based on overriding the first retransmission request time duration with the third retransmission request time duration and restarting the third retransmission request time duration based on determining that the third retransmission request time duration may have expired.

A method for wireless communications at a UE is described. The method may include receiving, for a set of multiple CCs, control signaling that indicates a first retransmission request time duration for requesting packet retransmission relative to when a packet in a sequence of packets is determined to be unsuccessfully received and transmitting, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the plurality that are associated with the at least one packet.

An apparatus for wireless communications at a UE is described. The apparatus may include a processor, memory coupled with the processor, and instructions stored in the memory. The instructions may be executable by the processor to cause the apparatus to receive, for a set of multiple CCs, control signaling that indicates a first retransmission request time duration for requesting packet retransmission relative to when a packet in a sequence of packets is determined to be unsuccessfully received and transmit, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the plurality that are associated with the at least one packet.

Another apparatus for wireless communications at a UE is described. The apparatus may include means for receiving, for a set of multiple CCs, control signaling that indicates a first retransmission request time duration for requesting packet retransmission relative to when a packet in a sequence of packets is determined to be unsuccessfully received and means for transmitting, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the plurality that are associated with the at least one packet.

A non-transitory computer-readable medium storing code for wireless communications at a UE is described. The code may include instructions executable by a processor to receive, for a set of multiple CCs, control signaling that indicates a first retransmission request time duration for requesting packet retransmission relative to when a packet in a sequence of packets is determined to be unsuccessfully received and transmit, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the plurality that are associated with the at least one packet.

Some examples of the method, apparatuses, and non-transitory computer-readable medium described herein may further include operations, features, means, or instructions for determining that the first retransmission request time duration satisfies a threshold, where overriding the first retransmission request time duration may be based on the determining.

Some examples of the method, apparatuses, and non-transitory computer-readable medium described herein may further include operations, features, means, or instructions for determining a reordering window length for the sequence of packets and determining that the reordering window length satisfies a threshold based on determining the reordering window length, where overriding the first retransmission request time duration with the second retransmission request time duration may be based on determining that the reordering window length satisfies the threshold.

Some examples of the method, apparatuses, and non-transitory computer-readable medium described herein may further include operations, features, means, or instructions for determining the second retransmission request time duration based on a first offset and a product of an integer and a HARQ RTT for the one or more CCs, where the integer may be associated with a level of the second retransmission request time duration, and where overriding the first retransmission request time duration with the second retransmission request time duration may be based on determining the second retransmission request time duration.

Some examples of the method, apparatuses, and non-transitory computer-readable medium described herein may further include operations, features, means, or instructions for determining the threshold based on an available reordering window for the sequence of packets, a retransmission request processing duration, or a product of a HARQ RTT for the one or more CCs and a throughput associated with the sequence of packets, where determining that the reordering window length satisfies the threshold may be based on determining the threshold.

In some examples of the method, apparatuses, and non-transitory computer-readable medium described herein, determining the threshold may include operations, features, means, or instructions for determining the threshold based on an integer multiple of the HARQ RTT.

Some examples of the method, apparatuses, and non-transitory computer-readable medium described herein may further include operations, features, means, or instructions for determining that the one or more CCs include two or more CCs, determining that each of the two or more CCs may be associated with a same numerology, and setting a HARQ RTT for the one or more CCs based on the two or more CCs being associated with the same numerology, where the threshold and the second retransmission request time duration may be based on the HARQ RTT.

Some examples of the method, apparatuses, and non-transitory computer-readable medium described herein may further include operations, features, means, or instructions for determining that the one or more CCs include two or more CCs, determining that each of the two or more CCs may be associated with at least two different numerologies, and setting a HARQ RTT for the one or more CCs based on a highest HARQ RTT of the two or more CCs, where the threshold and the second retransmission request time duration may be based on the HARQ RTT.

Some examples of the method, apparatuses, and non-transitory computer-readable medium described herein may further include operations, features, means, or instructions for determining that the one or more CCs may be one CC and setting a HARQ RTT for the one or more CCs based on a numerology of the one CC, where the threshold and the second retransmission request time duration may be based on the HARQ RTT.

In some examples of the method, apparatuses, and non-transitory computer-readable medium described herein, a HARQ RTT for the one or more CCs may be based on the respective numerology for the one or more CCs.

BRIEF DESCRIPTION OF THE DRAWINGS

FIGS. 3A and 3B illustrate examples of sequences of packets that support techniques for reducing a feedback time for communications over multiple wireless connections in accordance with aspects of the present disclosure.

DETAILED DESCRIPTION

Figure 1:
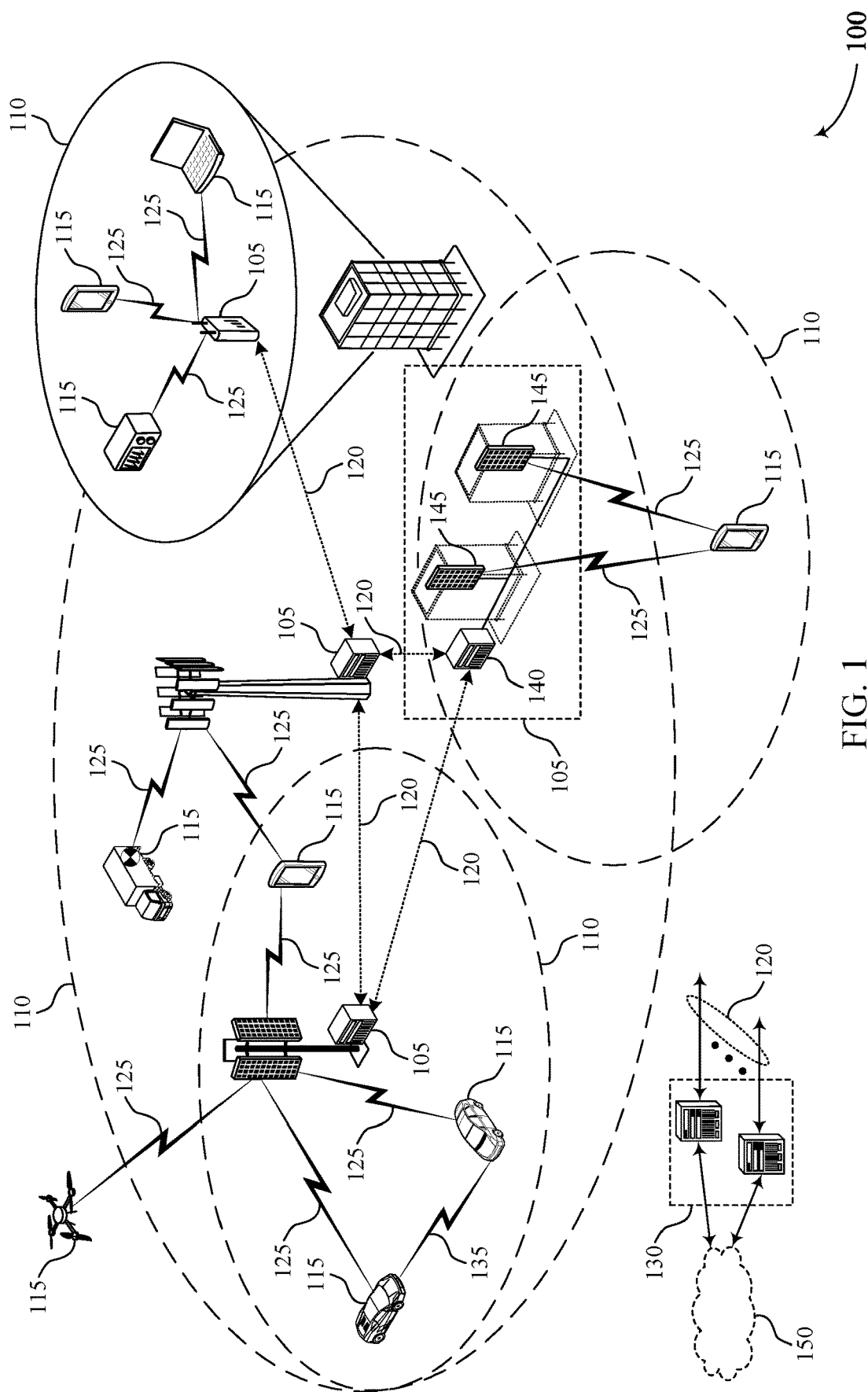
FIG. 1 illustrates an example of a wireless communications system that supports techniques for reducing a feedback time for communications over multiple wireless connections in accordance with aspects of the present disclosure.

In some cases, a user equipment (UE) may communicate (e.g., transmit in the downlink and/or uplink) with one or more base stations using two or more wireless connections (e.g., may communicate with one base station using the two or more wireless connections, with a respective base station for each wireless connection). For example, the base station and the UE may communicate using a first wireless connection and a second wireless connection, which may be respectively configured by the base station. The UE may reorder downlink traffic across the two connections, for example, while a first timer is running. The downlink traffic may be represented by packets from both connections within a buffer of the UE, which may be referred to as a reordering window (e.g., because the buffer includes packets that may be reordered while in the buffer). The reordering window may be limited, in some cases (e.g., to a predetermined quantity of data that may be stored by the buffer). The downlink traffic for the two connections may include a sequence of packets, where the packets associated with the first wireless connection may include a first subset of the sequence of packets and the packets associated with the second wireless connection may include a second subset of the sequence of packets. When the timer expires, the UE may flush or empty the buffer (e.g., may terminate flow control of the connections for any missing packets) and may deliver any received data to an application layer of the UE.

A radio link control (RLC) layer of the UE may attempt to recover missing packets (e.g., holes in the data) before the timer expires, for example, by sending RLC negative acknowledgements (NACKs) when an RLC reordering timer for the respective wireless connection expires. An RLC reordering timer may represent a reordering timer configured by the base station and associated with an RLC status report that may be transmitted to the base station to request retransmission of missing packets. In some cases, the RLC timers for the wireless connections may each have a relatively larger value, such that the buffer (e.g., reordering window) may reach its capacity for storing the combined data from the two wireless connections (e.g., may be full) before expiration of the RLC reordering timer (e.g., based on buffering downlink throughput from both wireless connections). Reaching the capacity of the buffer, or reordering window, may result in flushing the buffer before the RLC layer requests retransmission to recover holes in the data. In such cases, the data may be delivered to the application layer of the UE with holes in the data.

The present disclosure provides techniques to increase a likelihood of recovering holes in the data before flushing the shared or combined buffer. For example, the UE may enter a fast-NACK mode and may decrease a value of the respective RLC timer for one or both wireless connections (e.g., may decrease the RLC timer independently for each connection). Decreasing the RLC timer may be referred to as entering a fast-NACK mode, and may result in requesting retransmission of any missed packets before the shared buffer is filled. For example, the UE may identify a reordering window (e.g., an amount of data in the reordering window) that is maintained in the buffer based on a hole in data received via the first wireless connection. If the identified reordering window satisfies (e.g., exceeds, or meets or exceeds) a threshold, the UE may enter the fast-NACK mode. Additionally, or alternatively, the UE may enter the fast-NACK mode if the network (e.g., the base station) configures the respective RLC timer within a threshold of the corresponding first timer. In some cases, the UE may additionally, or alternatively, be configured with two or more component carriers (CCs) for a same wireless connection, and may determine a value of the decreased RLC timer based on a respective numerology for one or more of the CCs that may be associated with a missed packet.

The UE may determine to enter the fast-NACK mode for one or both of the wireless connections. Based on entering the fast-NACK mode, the UE may override a configured RLC timer for the respective wireless connection with a new, shorter timer. Based on expiration of the new timer, the UE may transmit an RLC NACK to the base station via the corresponding wireless connection. As described herein, the RLC NACK may be transmitted such that the transmission thereof may result in a higher downlink throughput.

Aspects of the disclosure are initially described in the context of wireless communications systems. Aspects of the disclosure are further illustrated by and described with reference to sequences of packets, an error detection scheme, process flows, apparatus diagrams, system diagrams, and flowcharts that relate to techniques for reducing a feedback time for communications over multiple wireless connections.

FIG. 1 illustrates an example of a wireless communications system 100 that supports techniques for reducing a feedback time for communications over multiple wireless connections in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

HARQ feedback may represent a MAC layer flow control, in which packets (e.g., MAC service data units (SDUs)) may be passed from the MAC layer to the RLC and/or PDCP layer(s) upon successful decoding of the packets by the MAC layer. In some cases (e.g., when communicating via multiple wireless connections or multiple CCs) a UE 115 may be configured with multiple HARQ processes, such that the UE 115 may perform RLC and/or PDCP reordering of the received packets at the RLC and/or PDCP layer(s) (e.g., reordering of the received packets from the multiple HARQ processes). For example, some HARQ processes may successfully transfer a packet to the RLC and/or PDCP layer(s), while others may perform multiple retransmissions before transferring to the RLC and/or PDCP layer(s) or may fail and may not be transferred to the RLC and/or PDCP layer(s).

A UE 115 may enter a fast-NACK mode for RLC and/or PDCP packet reordering, and may decrease a value of a respective RLC timer for one or more wireless connections (e.g., may decrease the RLC timer independently for each connection). Decreasing the RLC timer may be referred to as entering a fast-NACK mode, and may result in requesting retransmission of any missed packets before a shared buffer is filled. In some cases, the UE 115 may be configured with two or more CCs for a same wireless connection, and may determine a value of the decreased RLC timer based on a respective numerology for one or more of the CCs that may be associated with a missed packet. The UE 115 may determine to enter the fast-NACK mode for one or both of the wireless connections. Based on entering the fast-NACK mode, the UE 115 may override a configured RLC timer for the respective wireless connection with a new, shorter timer. Based on expiration of the new timer, the UE 115 may transmit an RLC NACK to a base station 105 via the corresponding wireless connection. As described herein, the RLC NACK may be transmitted such that the transmission thereof may result in a higher downlink throughput.

Figure 2:
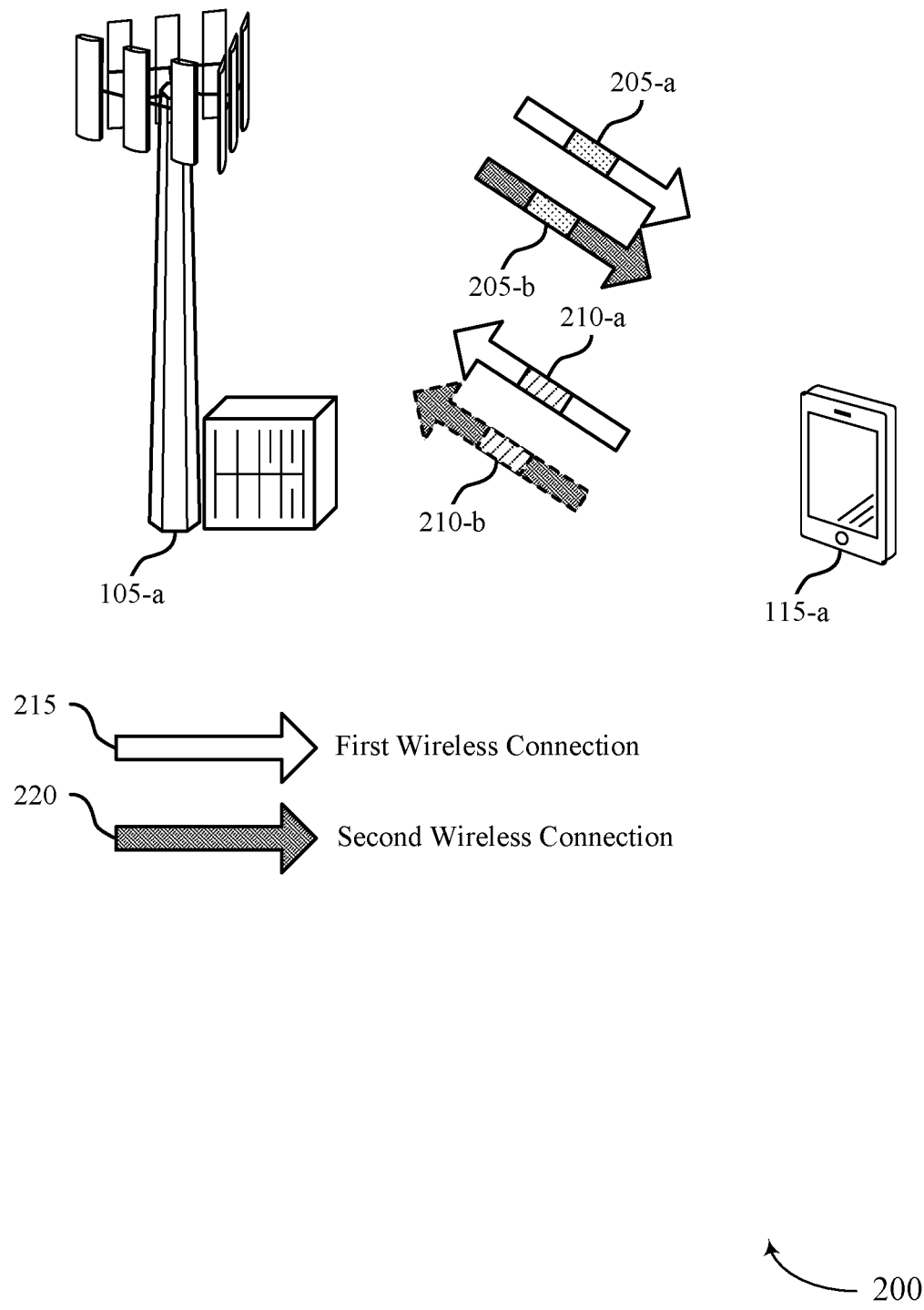
FIG. 2 illustrates an example of a wireless communications system that supports techniques for reducing a feedback time for communications over multiple wireless connections in accordance with aspects of the present disclosure.

FIG. 2 illustrates an example of a wireless communications system 200 that supports techniques for reducing a feedback time for communications over multiple wireless connections in accordance with aspects of the present disclosure. Wireless communications system 200 may include a base station 105-a and a UE 115-a, which may represent examples of a base station 105 and a UE 115 described with reference to FIG. 1. In some cases, base station 105-a and UE 115-a may operate in a dual connectivity (DC) mode, such as evolved terrestrial radio access network (E-UTRAN) NR dual connectivity (EN-DC) or NR dual connectivity (NR-DC) (e.g., among other examples). In the DC mode, base station 105-a and UE 115-a may communicate (e.g., transmit in the downlink and/or uplink) using two or more wireless connections. It is to be understood that while the examples described herein refer to one base station 105 (e.g., base station 105-*a*), these examples may equally apply to multiple base stations 105 (e.g., including base station 105-*a*) with which UE 115-*a* may communicate in the DC mode (e.g., UE 115-*a* may communicate with a respective base station 105 for each wireless connection).

For example, base station 105-*a* and UE 115-*a* may communicate using a first wireless connection 215 and a second wireless connection 220, which may be respectively configured by base station 105-*a*. In such a DC configuration (e.g., EN-DC or NR-DC), a PDCP layer of UE 115-*a* may reorder downlink traffic across the two connections, for example, while a PDCP reordering timer (e.g., a t-reordering timer) is running. The downlink traffic may be represented by packets or PDUs from both connections within a buffer of UE 115-*a*, which may be referred to as a PDCP reordering window (e.g., because the buffer includes packets that may be reordered while in the buffer). The reordering window may be limited, in some cases (e.g., to a predetermined quantity of data that may be stored by the buffer). The downlink traffic for the two connections may include a sequence of packets or PDUs, where the packets associated with the first wireless connection 215 may include a first subset of the sequence of packets and the packets associated with the second wireless connection 220 may include a second subset of the sequence of packets. When the PDCP reordering timer expires, the PDCP layer may flush or empty the buffer (e.g., may terminate flow control of the connections for any missing packets) and may deliver the received data to an application layer of UE 115-*a*.

An RLC layer of UE 115-*a* may attempt to recover missing packets or PDUs (e.g., holes in the data) before the PDCP reordering timer expires, for example, by sending RLC NACKs when an RLC reordering timer for the respective wireless connection expires. An RLC reordering timer may represent a reordering timer (e.g., t-reordering for LTE or t-reassembly for NR) associated with an RLC status report that may be transmitted to base station 105-*a* (e.g., to request retransmission of missing packets or PDUs). For example, the respective RLC reordering timer may be started (e.g., by UE 115-*a*) when a packet (e.g., a PDU) in a first subset of a sequence of packets is determined to be unsuccessfully received via a corresponding connection (e.g., when UE 115-*a* has missed the packet or PDU). At expiration of the respective RLC reordering timer, UE 115-*a* may transmit a retransmission request to base station 105-*a* for the missed packet or PDU (e.g., among other missed packets or PDUs).

The RLC timer for each wireless connection may be configured by base station 105-*a* via configuration signaling 205 (e.g., RRC signaling) over a respective wireless connection. For example, a first RLC timer for the first wireless connection 215 may be configured via configuration signaling 205-*a* and a second RLC timer for the second wireless connection 220 may be configured via configuration signaling 205-*b*. In some cases, configuration signaling 205-*a* and 205-*b* may be received via a same connection or via a same transmission.

In some cases, the RLC timers for the wireless connections may each have a relatively larger value, such that the buffer (e.g., reordering window) may reach its capacity for storing the combined data from the two wireless connections (e.g., may be full) before expiration of the RLC reordering timer (e.g., based on buffering downlink throughput from both wireless connections). Reaching the capacity of the buffer, or reordering window, may result in flushing the buffer before the RLC layer requests retransmission to recover holes in the data (e.g., to recover any missing packets or PDUs). In such cases, the data may be delivered to the application layer of UE 115-*a* with holes in the data, which may degrade transmission control protocol (TCP) throughput for UE 115-*a*.

For example, in some cases, downlink DC communications (e.g., via NR and LTE) may have a peak throughput, such as 10 gigabits per second (Gbps). In some cases, a hole in the downlink data may occur via one of the wireless connections (e.g., on LTE), and the corresponding RLC timer for the connection (e.g., t-reassembly) may be greater than a given value (e.g., 24 ms). In such cases, a reordering window may go beyond an available buffer space (e.g., may go beyond 30 megabytes (MB)), or an available reordering window budget, in order to request retransmission for the missed data.

The present disclosure provides techniques to increase a likelihood of recovering holes in the data before delivering the data to the application (e.g., before flushing the shared or combined buffer). For example, UE 115-*a* may enter a fast-NACK mode and may decrease a value of the respective RLC timer for one or both wireless connections (e.g., may decrease the RLC timer independently for each connection). Decreasing the RLC timer may be referred to as entering a fast-NACK mode, and may result in requesting retransmission of any missed packets (e.g., PDUs) earlier, which may reduce the likelihood for the buffer to be filled. For example, UE 115-*a* may identify a reordering window (e.g., an amount of data in the reordering window) that is maintained in the buffer based on a hole in data received via the first wireless connection 215. If the identified reordering window satisfies (e.g., exceeds, or meets or exceeds) a threshold, UE 115-*a* may enter the fast-NACK mode. Additionally, or alternatively, UE 115-*a* may enter the fast-NACK mode if the network (e.g., base station 105-*a*) configures the respective RLC timer within a threshold of the corresponding PDCP timer (e.g., having a value close to the PDCP timer). In some cases, UE 115-*a* may additionally, or alternatively be configured with two or more CCs for a same wireless connection, and may determine a value of the decreased RLC timer based on a respective numerology for one or more of the CCs that may be associated with a missed packet.

The fast-NACK mode may increase downlink throughput and may, for example, be configured to balance between throughput loss due to buffer flushing (e.g., as described herein) when the RLC timer is longer (e.g., NACK requests are less frequent) and throughput loss due to receiving duplicate RLC data when the RLC timer is shorter (e.g., NACK requests are more frequent or aggressive). Throughput loss may occur when the RLC timer is shorter, for example, if a NACK is sent to base station 105-*a* while HARQ recovery of the data is ongoing, such that duplicate data may be received by UE 115-*a* based on a HARQ retransmission and an RLC retransmission (e.g., if both retransmissions from base station 105-*a* are successful).

The fast-NACK mode may include one or more levels, where each level may be associated with a different value for the RLC timer (e.g., a different level of aggressiveness for sending a NACK). For example, the fast-NACK mode may be off, may be at a first level (e.g., Level 0), may be at a second level (e.g., Level 1), or may be at a third level (e.g., Level 2), based on one or more parameters. As described herein, when the fast-NACK mode is off the RLC timers may be maintained at a same value as configured by base station 105-*a* (e.g., via an RRC configuration). Entering the first level (e.g., Level 0) of the fast-NACK mode may be based on UE 115-*a* determining that one or more of the RLC timers configured by base station 105-*a* are too large (e.g., the one or more RLC timers each satisfy a corresponding threshold amount of time, such as by meeting or exceeding the threshold time).

For example, UE 115-*a* may compare the configured RLC timer for a wireless connection to a threshold that represents a respective multiple of a HARQ round trip time (RTT) for the wireless connection (e.g., k times the HARQ RTT, where k may be equal to three, four, five, etc.). If the RLC timer is greater than or equal to the respective threshold, UE 115-*a* may trim or reduce the one or more RLC timers. A HARQ RTT for a respective connection may be determined dynamically and empirically, for example, from past HARQ RTTs, as well as from estimates based on one or more variables. In some cases, the HARQ RTT for the connection may include an upper bound and a lower bound (e.g., as estimated) for the HARQ RTT. A HARQ RTT as described herein may be affected by (e.g., may depend on) whether a corresponding wireless connection is associated with a TDD or an FDD mode, a technology for the connection (e.g., LTE or NR), a numerology for the connection, a number of HARQ processes for the connection, or whether the HARQ for the connection is synchronous, among other examples.

Because entering the first level may be based on a respective threshold for each of the configured RLC timers, the first level may not be based on a reordering window or a reordering window size for either wireless connection (e.g., or for both wireless connections). In some cases, based on the configuration of the RLC timers (e.g., as configured by base station 105-*a*), a base fast-NACK level for UE 115-*a* may either be off or may be the first level (e.g., based on whether one or more RLC timers satisfy the respective threshold time). In such cases, there may be no switching back and forth between the off mode and the first level for fast-NACK (e.g., because one or the other may always be in operation, such as by default based on the configured values of the RLC timers).

Entering the second level (e.g., Level 1) or the third level (e.g., Level 2) of the fast-NACK mode for a wireless connection may be based on UE 115-*a* identifying an amount of the buffer or reordering window (e.g., amount of data in the buffer) that may be attributed to the wireless connection (e.g., connection i). For example, for a wireless connection i (e.g., the first wireless connection 215 or the second wireless connection 220), UE 115-*a* may determine an amount of data (e.g., an amount of packets or PDUs) of a corresponding reordering window (e.g., $R_i$) that may be attributed to the wireless connection i. If the reordering window (e.g., a sequence or an amount of packets or data) attributed to the connection satisfies a first threshold (e.g., a threshold number of packets or data) associated with the connection (e.g., a threshold $R_{1,i}$), UE 115-*a* may enter the second level of the fast-NACK mode. If the reordering window attributed to the connection satisfies a second threshold associated with the connection (e.g., a threshold $R_{2,i}$), UE 115-*a* may enter the third level of the fast-NACK mode.

UE 115-*a* may enter the fast-NACK mode and may send RLC NACKs to base station 105-*a*, for example, as long as an RLC hole (e.g., missing packets or PDUs) remains. In some cases, however, the hole may not be filled (e.g., any missing packets or PDUs may not be received) after expiration of the original RLC timer (e.g., t-reassembly, t-reordering). If there is only one hole (e.g., a hole X) the RLC timer may not be restarted upon expiration, such that UE 115-*a* may not send further RLC NACKs until polled by the network. In such cases, if a polling interval for the network is much greater than a t-statusProhibit timer, a delay until a next RLC NACK is sent may become relatively large. In order to reduce such delays, if there is an unrecovered hole (e.g., missing packets or PDUs) associated with a wireless connection, upon expiration of the original RLC timer UE 115-*a* may restart the RLC timer when a next RLC PDU arrives on the wireless connection. Additionally, or alternatively, if there is an unrecovered hole (e.g., missing packets or PDUs) associated with a wireless connection, upon expiration of the original RLC timer UE 115-*a* may restart the RLC timer (e.g., immediately), using a timer value associated with a fast-NACK level being used by UE 115-*a*.

The thresholds for entering the second and third levels of the fast-NACK mode may be dynamic for the respective connection and may, for example, be based on a HARQ RTT for the connection and a total downlink throughput, among other examples. In such cases, different HARQ RTTs for different numerologies (e.g., NR numerologies, such as subcarrier spacing and cyclic prefixes) may result in different thresholds for each numerology (e.g., for each different NR numerology, as well as for LTE). Because the thresholds for entering the second level and the third level may be based on the HARQ RTT for a given connection, different wireless connections may be associated with different, respective thresholds for entering the second level and/or the third level. For example, the first wireless connection 215 may be associated with a first threshold for entering the second level and the second wireless connection 220 may be associated with a second threshold for entering the second level.

As such, UE 115-*a* may, in some cases, enter a fast-NACK mode (e.g., the second or third level of fast-NACK) for one wireless connection while maintaining its configured RLC timers for the other wireless connection (e.g., based on the different thresholds for entering the fast-NACK mode). For example, UE 115-*a* may enter the second level or the third level of fast-NACK for the first wireless connection 215, while maintaining fast-NACK off (e.g., maintaining the configured RLC timers) or in the first level for the second wireless connection. Upon entering a level (e.g., the first, second, or third level) of fast-NACK for a wireless connection, UE 115-*a* may override the configured RLC timer for that wireless connection with a new, shortened timer. For example, UE 115-*a* may replace the value of the RLC timer for the wireless connection with a new value for the timer. The value of the new timer (e.g., new RLC timer) may be based on HARQ RTT for the wireless connection, and may therefore correspond to the numerology for the connection (e.g., be tailored to LTE, or to different numerologies for NR).

When overriding the configured RLC timer (e.g., replacing the timer value), the new RLC timer (e.g., t-reassembly, t-reordering) for the fast-NACK mode (e.g., for the first, second, or third level of fast-NACK) may be large enough to support a relatively high probability of HARQ recovery of any missing packets or data. For example, the new RLC timer may be configured to wait for a defined number of HARQ retransmissions (e.g., a number of HARQ RTTs), such that a success of the HARQ process may be increased (e.g., may be maximized). Doing so may also reduce (e.g., minimize) throughput loss due to RLC duplicates of HARQ retransmissions. For example, a new RLC timer for the second level (e.g., Level 1) may be set to the time taken for two HARQ retransmissions (e.g., two HARQ RTTs) for the corresponding connection, which may, in some cases, result in a throughput loss of 0.3% (e.g., based on a 10% block error rate (BLER) for each HARQ retransmission). Similarly, a new RLC timer for the third level (e.g., Level 2) may be set to the time taken for one HARQ retransmission (e.g., one HARQ RTT) for the corresponding connection, which may, in some cases, result in a throughput loss of 2.4% (e.g., based on a 10% BLER for the HARQ retransmission).

A new RLC timer for the second level (e.g., Level 1) of fast-NACK for a wireless connection may, in some cases, be given by an equation similar to Equation (1):

$$\text{timer}=\min(\text{RRC\_config}, n1*\text{HARQ\_RTT}+\delta) \quad (1)$$

where timer represents the new RLC timer for the fast-NACK mode (e.g., t-reassembly, t-reordering), min represents a minimum function, RRC_config represents a value of the configured RLC timer (e.g., RRC configured timer), n1 represents a number of HARQ retransmissions to wait before the end of the new RLC timer (e.g., two HARQ retransmissions), HARQ_RTT represents a HARQ RTT for the corresponding wireless connection, and δ represents a margin of time (e.g., between receiving a retransmission and sending a NACK) to ensure that an entire slot is processed (e.g., where δ>0 and δ may also be configurable based on one or more conditions).

A new RLC timer for the third level (e.g., Level 2) of fast-NACK for a wireless connection may, in some cases, be given by an equation similar to Equation (2):

$$\text{timer}=\min(\text{RRC\_config}, n2*\text{HARQ\_RTT}+\delta) \quad (2)$$

where timer represents the new RLC timer for the fast-NACK mode (e.g., t-reassembly, t-reordering), min represents a minimum function, RRC_config represents a value of the configured RLC timer (e.g., RRC configured timer), n2 represents a number of HARQ retransmissions to wait before the end of the new RLC timer (e.g., one HARQ retransmission), HARQ_RTT represents a HARQ RTT for the corresponding wireless connection, and δ represents a margin (e.g., between receiving a retransmission and sending a NACK) to ensure that an entire slot is processed (e.g., where δ>0 and δ may also be configurable based on one or more conditions).

When setting the new value(s) for the RLC timer(s), UE 115-a may also change or override a second timer (e.g., change or replace a value for the second timer), which may be referred to as t-statusProhibit. The timer t-statusProhibit may represent a time to wait after sending an RLC NACK (e.g., an RLC status update) before sending a next RLC NACK (e.g., a next RLC status update). For example, a time interval (e.g., minimum time interval) between consecutive uplink RLC status updates may be given by an equation similar to Equation (3):

$$t_{status}=\min(\max(\text{polling}_{interval}, t\text{-statusProhibit}), \max(t\text{-reassembly}, t\text{-statusProhibit})) \quad (3)$$

where $t_{status}$ represents the time interval between consecutive RLC status updates, min represents a minimum function, max represents a maximum function, polling_interval represents a network polling interval for the RLC status, t-statusProhibit represents a t-statusProhibit timer as described herein, and t-reassembly represents an RLC timer (e.g., t-reassembly, t-reordering) as described herein. A polling interval (e.g., at the network) may be based on how fast a parameter, such as pollPDU or pollBytes, is met or if a timer (e.g., t-PollRetransmit expires. In some cases, UE 115-a may also set or override the t-statusProhibit timer to the new value determined for the RLC timer for fast-NACK (e.g., as given by Equation (1) or Equation (2)).

As described herein, UE 115-a may enter the second or third level of the fast-NACK mode for a respective connection when a reordering window attributed to the connection (e.g., $R_i$) satisfies a first threshold (e.g., $R_{1,i}$) or a second threshold (e.g., $R_{2,i}$), respectively. The second threshold for entering the third level of the fast-NACK mode may be given by an equation similar to Equation (4):

$$R_{2,i}=\max(0, R_{max}-[T\text{put}_1+T\text{put}_2]*[\text{HARQ\_RTT}_i+T_{rlc\_retx,i}]) \quad (4)$$

where $R_{2,i}$ represents the second threshold for entering the third level for wireless connection i (e.g., where i=1 or 2 for DC), max represents a maximum function, $R_{max}$ represents a maximum available reordering window (e.g., buffer) for the first wireless connection 215 and the second wireless connection 220, $Tput_1$ represents a downlink throughput for the first wireless connection 215 (e.g., as measured at a MAC layer of UE 115-a), $Tput_2$ represents a downlink throughput for the second wireless connection 220 (e.g., as measured at a MAC layer of UE 115-a), $HARQ\_RTT_i$ represents a HARQ RTT for wireless connection i, and $T_{rlc\_retx,i}$ represents a time from transmitting an RLC status (e.g., RLC NACK) until an RLC retransmission arrives and is processed at UE 115-a.

Using Equation (4) (e.g., or a similar equation) to set the second threshold may represent a method for backing off from the maximum or available reordering window (e.g., $R_{max}$) and setting the second threshold for the wireless connection i to buffer downlink throughput until the new RLC timer (e.g., Level 2 t-reassembly) expires and an RLC retransmission arrives. In some cases, $HARQ\_RTT_i$ in Equation (4) (e.g., or a similar equation) may approximate, or may be used to approximate, a length of the new RLC timer for the fast-NACK mode.

The first threshold for entering the second level (e.g., Level 1) of the fast-NACK mode may be given by an equation similar to Equation (5):

$$R_{1,i}=\min(k*\text{HARQ\_RTT}_i, \max(0, R_{2,i}-[T\text{put}_1+T\text{put}_2]*\text{HARQ\_RTT}_i)) \quad (5)$$

where $R_1$ represents the first threshold for entering the second level for wireless connection i (e.g., where i=1 or 2 for DC), min represents a minimum function, k represents a multiplier (e.g., where a default value for k may be 5) that indicates a number of HARQ RTTs for which the RLC timer (e.g., t-reassembly) is running before an immediate switch to the second level, $HARQ\_RTT_i$ represents a HARQ RTT for wireless connection i, max represents a maximum function, $R_{2,i}$ represents the second threshold for entering the third level for wireless connection i, $Tput_1$ represents a downlink throughput for the first wireless connection 215 (e.g., as measured at a MAC layer of UE 115-a), and $Tput_2$ represents a downlink throughput for the second wireless connection 220 (e.g., as measured at a MAC layer of UE 115-a).

Using Equation (5) (e.g., or a similar equation) to set the first threshold may represent a method for backing off from the second threshold (e.g., using $R_{2,i}$ as a starting point) and setting the first threshold for the wireless connection i to buffer for an additional HARQ RTT before switching to the third level. Equation (5) (e.g., or a similar equation) may also be structured such that if the RLC timer (e.g., t-reassembly) is running for k HARQ RTTs, UE 115-a may immediately switch to the second level of the fast-NACK mode (e.g., and may also immediately expire the RLC timer in order to send the RLC NACK).

Equations (4) and (5) (e.g., or similar equations) may also be used to generate respective thresholds when UE 115-a and base station 105-*a* use a single wireless connection (e.g., the first wireless connection 215) to communicate (e.g., instead of communicating using a DC mode). In such cases, both equations may be modified by dropping the term $Tput_2$ and using a subscript 1 for each i in the equations (e.g., for the single wireless connection). Similarly, it may be appreciated by one of skill in the art that Equations (4) and (5) may be modified to extend to three or more wireless connections without departing from the scope of the present disclosure.

As described herein, UE 115-*a* may use Equations (4) and (5) (e.g., or similar equations) to determine a respective threshold for entering the second level or the third level of the fast-NACK mode for a wireless connection. Using the techniques described herein, UE 115-*a* may determine to enter the first level, the second level, or the third level of the fast-NACK mode for the first wireless connection 215, the second wireless connection 220, or both. For example, UE 115-*a* may determine to enter a level of the fast-NACK mode for the first wireless connection 215. Based on entering the respective level of the fast-NACK mode, UE 115-*a* may override (e.g., change or replace a timer value) a configured RLC timer for the first wireless connection 215 with a new timer (e.g., as given by one of Equations (1) and (2), or a similar equation). Based on expiration of the new timer, UE 115-*a* may transmit an RLC NACK 210-*a* to base station 105-*a* via the first wireless connection 215. The RLC NACK 210-*a* may be transmitted sooner than an RLC NACK 210 may typically be transmitted, for example, without overriding the corresponding RLC timer. Based on the sooner transmission, base station 105-*a* may retransmit one or more missing packets (e.g., PDUs) to UE 115-*a*, which may result in a higher downlink throughput.

Similarly, in some cases, UE 115-*a* may determine to enter a level of the fast-NACK mode for the second wireless connection 220. Based on entering the respective level of the fast-NACK mode, UE 115-*a* may override a configured RLC timer for the second wireless connection 220 with a new timer (e.g., as given by one of Equations (1) and (2), or a similar equation). Based on expiration of the new timer, UE 115-*a* may transmit an RLC NACK 210-*b* to base station 105-*a* via the second wireless connection 220. As described herein, the RLC NACK 210-*b* may be transmitted such that the transmission thereof may result in a higher downlink throughput.

FIGS. 3A and 3B illustrate respective examples of sequences of packets 301 and 302 that support techniques for reducing a feedback time for communications over multiple wireless connections in accordance with aspects of the present disclosure. Sequences of packets 301 and 302 may implement or may be implemented by one or more aspects of wireless communications system 100 or 200. For example, the sequences of packets 301 and 302 may each respective represent a sequence of packets received by a UE 115 (e.g., from a base station 105), where each sequence of packets (e.g., sequence of PDUs) may include a first subset 305 of packets received over a first wireless connection and a second subset 310 of packets receive over a second wireless connection. In some cases, some of the packets of the respective sequence may be missing, and the UE 115 may determine to transmit (e.g., send) an RLC NACK to the base station 105 to recover the missing packets.

For example, as illustrated by FIG. 3A, the UE 115 may be missing (e.g., may fail to correctly receive) packets corresponding to sequence numbers 0 and 8001 to 8050. Additionally, or alternatively, as illustrated by FIG. 3B, the UE 115 may be missing (e.g., may fail to correctly receive) packets corresponding to sequence numbers 31 to 33, 152 to 160, and 166 to 170. Such examples are merely exemplary, and it is to be understood that any amount and ordering of sequence numbers (e.g., or other packet numbering) may be missed by the UE 115 without departing from the scope of the present disclosure.

As described with reference to FIG. 2, the UE 115 may determine to enter a fast-NACK mode for a respective wireless connection, for example, based on a threshold reordering window in comparison with a reordering window (e.g., $R_i$) attributed to the wireless connection, where $R_i$ may be less than or equal to a total reordering window R (e.g., a buffer) occupied by the packets received via the first wireless connection and second wireless connection (e.g., $R_i \leq R$). The fast-NACK mode may be entered into on a connection basis (e.g., based on a reordering window attributed to the respective connection), for example, in order to avoid entering the fast-NACK mode for a connection that is not causing a delay in the reordering window (e.g., is not blocking the sequence of packets from being sent to a higher layer based on a hole in the packets).

In order to determine a reordering window (e.g., $R_i$) attributed to a respective wireless connection (e.g., the first wireless connection or the second wireless connection), the UE 115 may identify a first PDCP sequence number corresponding to a highest RLC sequence number for the sequence of packets (e.g., sequence 301 or 302). For example, for a connection i, the UE 115 may identify a PDCP sequence number $P_i$, which may correspond to an RLC sequence number $RX\_Next_i - 1$, which may represent a highest received RLC sequence number. The UE 115 may further determine a second PDCP sequence number that indicates a lowest missing PDCP sequence number (e.g., RX_DELIV) from the respective subset associated with connection i (e.g., from the first subset 305).

If the second PDCP sequence number is equal to the first PDCP sequence number plus one (e.g., $RX\_DELIV = P_i + 1$), or a next PDCP sequence number following the first PDCP sequence number, then the blocking PDCP sequence number is associated with the wireless connection i (e.g., the first wireless connection) and $R_i$ is set equal to the total reordering window, R. If the second PDCP sequence number is not equal to the first PDCP sequence number plus one (e.g., $RX\_DELIV \neq P_i + 1$), then the blocking PDCP sequence number is not associated with the wireless connection i (e.g., is associated with the other wireless connection) and $R_i$ is set equal to a reordering window length that includes packets associated with PDCP sequence numbers greater than the second PDCP sequence number (e.g., packets> RX_DELIV).

In the example illustrated by FIG. 3A, the reordering window attributed to the first wireless connection (e.g., $R_1$, associated with the first subset 305 of packets) may be set to 8050 (e.g., a total value of the received PDCP sequence numbers in the reordering window), because the entire reordering window may be "blocked" by missing PDCP sequence number 0. Similarly, the reordering window attributed to the second wireless connection (e.g., $R_2$, associated with the second subset 310 of packets) may be set to 50, because the last 50 packets of the reordering window may be "blocked" by missing PDCP sequence numbers 8001 through 8050. In the example illustrated by FIG. 3B, the reordering window attributed to the first wireless connection (e.g., $R_1$, associated with the first subset 305 of packets) may be set to 153, because the entire reordering window (e.g., any received PDCP sequence numbers) following PDCP sequence number 30 may be "blocked" by missing sequence numbers 31 through 33. Similarly, the reordering window attributed to the second wireless connection (e.g., $R_2$, associated with the second subset 310 of packets) may be set to 35, because the last 35 received packets (e.g., PDCP sequence numbers 161 through 165 and 171 through 200) of the reordering window may be "blocked" by missing PDCP sequence numbers 152 through 160.

As described with reference to FIG. 2, a respective wireless connection (e.g., the first or second wireless connection) may enter a fast-NACK mode if the reordering window attributed to the wireless connection (e.g., $R_i$) satisfies a corresponding threshold reordering window for the wireless connection (e.g., $R_{1,i}$ or $R_{2,i}$). As such, if the UE 115 determines the reordering window (e.g., an amount or sequence of packets or data) for a respective wireless connection, and further determines that the reordering window (e.g., an amount of packets or data) for the wireless connection satisfies a threshold (e.g., a threshold amount of packets or data) for the second level of the fast-NACK mode, the UE 115 may enter the second level of the fast-NACK mode. Similarly, if the UE 115 determines that the reordering window for the wireless connection satisfies a threshold for the third level of the fast-NACK mode, the UE 115 may enter the third level of the fast-NACK mode (e.g., with or without having first entered the second level).

As further described with reference to FIG. 2, the threshold(s) for the wireless connection may be based on a total available reordering window (e.g., $R_{max}$, maximum reordering window, maximum buffer size), and may be based on a throughput for the first wireless connection (e.g., $Tput_1$) and a throughput for the second wireless connection (e.g., $Tput_2$). In some cases, these techniques described herein may further be applied to a scenario with multiple data radio bearers (DRBs). For example, the UE 115 may have a subscription that uses multiple DRBs, such as acknowledged mode (AM) DRBs and unacknowledged mode (UM) DRBs. The UE 115 may pool all the RLC DRBs for the subscription, and in such cases, may modify the fast-NACK thresholds per DRB (e.g., may scale down the thresholds in order to keep the thresholds from increasing with the amount of DRBs, as based on the increase of $R_{max}$ as the amount of DRBs increases).

In such cases, a throughput for a respective wireless connection i due to AM DRBs may be given by an equation similar to Equation (6):

$$Tput_i^a = Tput_i - \Sigma_{k=1}^{N_i^u} Tput_{i,k}^u \quad (6)$$

where $Tput_i^a$ represents a throughput due to AM DRBs for wireless connection i, $Tput_i$ represents a total throughput for wireless connection i, $N_i^u$ represents a number of UM DRBs for wireless connection i (e.g., considering split and non-split DRBs), k represents a respective UM DRB, and $Tput_{i,k}^u$ represents a throughput for UM DRB k on wireless connection i. Equation (6) may effectively represent subtracting, for wireless connection i, the throughput for all UM DRBs from a total downlink throughput to arrive at a throughput due to AM DRBs. In some cases (e.g., over a large enough time interval), the AM DRB throughput (e.g., $Tput_i^a$) may be equally split among all AM DRBs for wireless connection i.

Similarly, an available reordering window (e.g., similar to $R_{max}$, for AM DRBs) for the multiple DRB mode may be given be an equation similar to Equation (7):

$$R'_{max} = R_{max} - \Sigma_{k=1}^{N_1^u} t_{1,k} * Tput_{1,k}^u - \Sigma_{k=1}^{N_2^u} t_{2,k} * Tput_{2,k}^u \quad (7)$$

where $R'_{max}$ represents an available reordering window (e.g., as scaled to apply to the AM DRBs), $R_{max}$ may represent a total available reordering window (e.g., applied to all DRBs), k represents a respective UM DRB, $t_{1,k}$ represents an RLC timer (e.g., t-reassembly, t-reordering) for the first wireless connection, $t_{2,k}$ represents an RLC timer for the second wireless connection, $N_1^u$ represents a number of UM DRBs for the first wireless connection (e.g., considering split and non-split DRBs), $N_2^u$ represents a number of UM DRBs for the second wireless connection (e.g., considering split and non-split DRBs), $Tput_{1,k}^u$ represents a throughput for UM DRB k on the first wireless connection, and $Tput_{2,k}^u$ represents a throughput for UM DRB k on the second wireless connection. Based on Equation (7) (e.g., or a similar equation), the UE 115 may reserve a reordering window for UM DRBs to buffer their data until a corresponding RLC timer expires.

The UE 115 may determine the thresholds for fast-NACK mode (e.g., for the second and third levels) per DRB, per wireless connection. The UE 115 may use equations similar to Equations (4) and (5) as described herein, with the variable $R_{max}$ replaced by $R_{max,k}$ as given by an equation similar to Equation (8) or Equation (9). For example, if the respective DRB is a split DRB, the UE 115 may use an equation similar to Equation (8):

$$R_{max,k} = R'_{max} * \frac{\frac{Tput_1^a}{N_1^a} + \frac{Tput_2^a}{N_2^a}}{Tput_1^a + Tput_2^a} \quad (8)$$

where $R_{max,k}$ represents an available reordering window for the wireless connection on a DRB k, $R'_{max}$ represents an available reordering window (e.g., as scaled to apply to the AM DRBs) as given by Equation (7), $Tput_1^a$ represents a throughput due to AM DRBs for the first wireless connection, $Tput_2^a$ represents a throughput due to AM DRBs for the second wireless connection, $N_1^a$ represents a number of AM DRBs for the first wireless connection, and $N_2^a$ represents a number of AM DRBs for the second wireless connection.

Additionally, or alternatively, if the respective DRB is a non-split DRB, the UE 115 may use an equation similar to Equation (9):

$$R_{max,k} = R'_{max} * \frac{Tput_i^a / N_i^a}{Tput_1^a + Tput_2^a} \quad (9)$$

where $R_{max,k}$ represents an available reordering window for the wireless connection on a DRB k, $R'_{max}$ represents an available reordering window (e.g., as scaled to apply to the AM DRBs) as given by Equation (7), $Tput_i^a$ represents a throughput due to AM DRBs for wireless connection i, $Tput_1^a$ represents a throughput due to AM DRBs for the first wireless connection, $Tput_2^a$ represents a throughput due to AM DRBs for the second wireless connection, $N_i^a$ represents a number of AM DRBs for wireless connection i, $N_1^a$ represents a number of AM DRBs for the first wireless connection, and $N_2^a$ represents a number of AM DRBs for the second wireless connection. When using either of Equations (8) or (9) to determine an $R_{max,k}$ value for either of Equations (4) or (5), the UE 115 may also replace a throughput for wireless connection i (e.g., $Tput_i$) with an average throughput as given by $Tput_i^a / N_i^a$.

In some cases, these techniques described herein may further be applied to a scenario with multiple DRBs on multiple subscriptions. For example, the UE 115 may have multiple subscriptions, which may each use multiple DRBs, such as AM DRBs and UM DRBs. In some cases, the multiple subscriptions may be part of a dual subscription dual active (DSDA) mode for the UE 115, such that the subscriptions may each use different uplink and downlink resources. As such, a tuneaway procedure may not occur for DSDA mode. In such cases, one subscription may be designated as a dedicated data subscription (DDS) and may be assigned a higher priority for reordering window (e.g., buffer) utilization.

In DSDA mode, a throughput for a respective wireless connection i and subscription j due to AM DRBs may be given by an equation similar to Equation (10):

$$Tput_{i,j}^a = Tput_{i,j} - \Sigma_{k=1}^{N_i^u} Tput_{i,j,k}^u \quad (10)$$

where $Tput_{i,j}^a$ represents a throughput due to AM DRBs for wireless connection i and subscription j, $Tput_{i,j}$ represents a total throughput for wireless connection i and subscription j, $N_i^u$ represents a number of UM DRBs for wireless connection i (e.g., considering split and non-split DRBs), k represents a respective UM DRB, and $Tput_{i,j,k}^u$ represents a throughput for UM DRB k on wireless connection i and subscription j. Equation (6) may effectively represent subtracting, for wireless connection i and subscription j, the throughput for all UM DRBs from a total downlink throughput to arrive at a throughput due to AM DRBs.

Similarly, an available reordering window (e.g., similar to $R_{max}$ for AM DRBs) for the multiple DRB mode, multiple subscription mode, may be given by an equation similar to Equation (11):

$$R'_{max} = R_{max} - \Sigma_{k=1}^{N_1^u} t_{1,1,k} * Tput_{1,1,k}^u - \Sigma_{k=1}^{N_2^u} t_{1,2,k} * Tput_{1,2,k} - \Sigma_{k=1}^{N_{2,1}^u} t_{2,1,k}^u - \Sigma_{k=1}^{N_{2,2}^u} t_{2,2,k} * Tput_{2,2,k}^u \quad (11)$$

where $R'_{max}$ represents an available reordering window (e.g., as scaled to apply to the AM DRBs), $R_{max}$ may represent a total available reordering window (e.g., applied to all DRBs), k represents a respective UM DRB, $t_{1,1,k}$ represents an RLC timer (e.g., t-reassembly, t-reordering) for the first wireless connection and the first subscription, $t_{1,2,k}$ represents an RLC timer (e.g., t-reassembly, t-reordering) for the first wireless connection and the second subscription, $t_{2,1,k}$ represents an RLC timer for the second wireless connection and the first subscription, $t_{2,2,k}$ represents an RLC timer for the second wireless connection and the second subscription, $N_{1,1}^u$ represents a number of UM DRBs for the first wireless connection and the first subscription (e.g., considering split and non-split DRBs), $N_{1,2}^u$ represents a number of UM DRBs for the first wireless connection and the second subscription, $N_{2,1}^u$ represents a number of UM DRBs for the second wireless connection and the first subscription (e.g., considering split and non-split DRBs), $N_{2,2}^u$ represents a number of UM DRBs for the second wireless connection and the second subscription, $Tput_{1,1,k}^u$ represents a throughput for UM DRB k on the first wireless connection and the first subscription, $Tput_{1,2,k}^u$ represents a throughput for UM DRB k on the first wireless connection and the second subscription, $Tput_{2,1,k}^u$ represents a throughput for UM DRB k on the second wireless connection and the first subscription, and $Tput_{2,1,k}^u$ represents a throughput for UM DRB k on the second wireless connection and the second subscription. Based on Equation (11) (e.g., or a similar equation), the UE 115 may reserve a reordering window for UM DRBs to buffer their data until a corresponding RLC timer expires.

The UE 115 may determine the thresholds for fast-NACK mode (e.g., for the second and third levels) per DRB, per wireless connection, per subscription. The UE 115 may use equations similar to Equations (4), (5), (8), and (9) as described herein, with the variable $R'_{max}$ in Equation (8) or (9) replaced by $R_{max,j}$ as given by an equation similar to Equation (12) or Equation (13), where j may represent a respective subscription j. For example, if the respective subscription is a DDS (e.g., a subscription where j=1), the UE 115 may use an equation similar to Equation (12):

$$R_{max,1} = M_{DDS} + R'_{max} * \frac{Tput_{1,1}^a + Tput_{2,1}^a}{Tput_{1,1}^a + Tput_{2,1}^a + Tput_{1,2}^a + Tput_{2,2}^a} \quad (12)$$

where $R_{max,1}$ represents an available reordering window for the wireless connection on a DDS subscription (e.g., a first subscription), $M_{DDS}$ represents an offset or margin for prioritizing the DDS subscription, $R'_{max}$ represents an available reordering window (e.g., as scaled to apply to the AM DRBs) as given by Equation (11), $Tput_{1,1}^a$ represents a throughput due to AM DRBs for the first wireless connection and the first subscription, $Tput_{1,2}^a$ represents a throughput due to AM DRBs for the first wireless connection and the second subscription, $Tput_{2,1}^a$ represents a throughput due to AM DRBs for the second wireless connection and the first subscription, and $Tput_{2,2}^a$ represents a throughput due to AM DRBs for the second wireless connection and the second subscription.

Additionally, or alternatively, if the respective subscription is a non-DDS subscription, the UE 115 may use an equation similar to Equation (13):

$$R_{max,2} = -M_{DDS} + R'_{max} * \frac{Tput_{1,2}^a + Tput_{2,2}^a}{Tput_{1,1}^a + Tput_{2,1}^a + Tput_{1,2}^a + Tput_{2,2}^a} \quad (13)$$

where $R_{max,2}$ represents an available reordering window for the wireless connection on a non-DDS subscription (e.g., a second subscription), $M_{DDS}$ represents an offset or margin for prioritizing the DDS subscription, $R'_{max}$ represents an available reordering window (e.g., as scaled to apply to the AM DRBs) as given by Equation (11), $Tput_{1,1}^a$ represents a throughput due to AM DRBs for the first wireless connection and the first subscription, $Tput_{1,2}^a$ represents a throughput due to AM DRBs for the first wireless connection and the second subscription, $Tput_{2,1}^a$ represents a throughput due to AM DRBs for the second wireless connection and the first subscription, and $Tput_{2,2}^a$ represents a throughput due to AM DRBs for the second wireless connection and the second subscription.

In some cases, the UE 115 may operate with multiple subscriptions in a dual subscription dual standby (DSDS) mode, where a tuneaway procedure may occur from a first subscription to a second subscription (e.g., on a first wireless connection) when changing a subscription for receiving or transmitting data. In such cases, the UE 115 may miss a PDCP or RLC sequence number communicated via the first wireless connection and may transmit an RLC NACK upon exiting the tuneaway (e.g., in order to be able to transmit on the first subscription). In some cases, when the first wireless connection is in a tuneaway, the UE 115 may buffer traffic received via the second connection, and if the tuneaway is long enough, the PDCP buffer may become full and the downlink throughput may be reduced for both connections (e.g., as described herein).

In order to avoid filling the buffer, the UE 115 may slow down the fast-NACK mode for the second connection, for example, by disabling RLC NACK reporting based on the corresponding RLC timer or by returning or reverting the corresponding RLC timer to its previously configured duration (e.g., as configured by RRC). For example, the UE 115 may disable the fast-NACK mode during tuneaway, even if the reordering window is large. At the end of the tuneaway, the UE 115 may trigger a NACK immediately on both connections. Any missing packets (e.g., PDUs) from the second connection may be recovered concurrently with recovering any missing packets from the first connection, which may have a larger amount of packets to recover (e.g., due to the tuneaway), such that no extra delay may be added by disabling RLC NACK or disabling fast-NACK during a tuneaway. In some cases, such techniques may also support a loose synchronization of the PDCP sequence numbers on both wireless connections at the end of the tuneaway.

In some cases, as described herein, the UE 115 may not enter the fast-NACK mode for the second connection while the first connection is in tuneaway, for example, because a larger reordering window may be attributed to the first connection and a relatively smaller reordering window (e.g., a lower or zero reordering window) may be attributed to the second connection.

Figure 4:
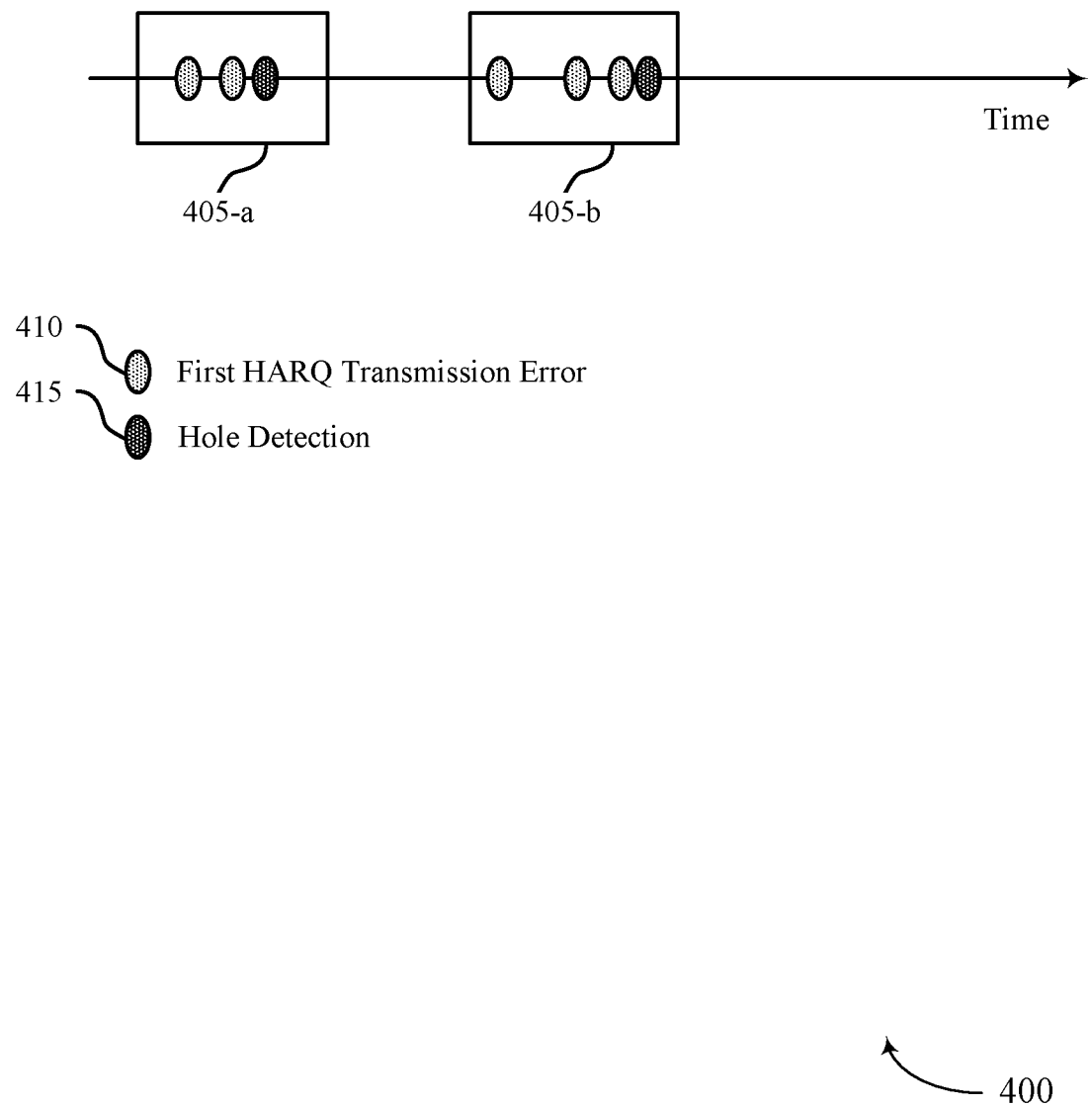
FIG. 4 illustrates an example of an error detection scheme that supports techniques for reducing a feedback time for communications over multiple wireless connections in accordance with aspects of the present disclosure.

FIG. 4 illustrates an example of an error detection scheme 400 that supports techniques for reducing a feedback time for communications over multiple wireless connections in accordance with aspects of the present disclosure. Error detection scheme 400 may implement or may be implemented by one or more aspects of wireless communications system 100 or 200. For example, error detection scheme 400 may represent a sequence of packets missed by a UE 115 (e.g., as transmitted from a base station 105). In some cases, some of the packets of the sequence may be missing, and the UE 115 may determine to transmit (e.g., send) an RLC NACK to the base station 105 to recover the missing packets, as described herein. For example, the UE 115 may enter a fast-NACK mode, as described with reference to FIGS. 2, 3A, and 3B, such as in accordance with one or more of the techniques described with reference to FIGS. 2, 3A, and 3B.

As described with reference to FIG. 2, in some cases, the UE 115 may be configured with multiple CCs for a respective wireless connection (e.g., for a single wireless connection or for a split-DRB DC) for carrier aggregation. In such cases, some of the multiple CCs may have different numerology and a HARQ RTT (e.g., used to set one or more of the fast-NACK parameters described herein) may be based on a numerology of a CC with a missing packet (e.g., a HARQ error). In some cases, a missing packet (e.g., RLC hole) that triggers an RLC timer may be due to a HARQ error (e.g., a missing packet) on one or more CCs. For example, when a HARQ error (e.g., a missing packet, RLC hole) on a first transmission is detected for a respective CC, layer 1 (L1) of the UE 115 may send an indication of a CC identifier (ID) for the CC to the RLC layer of the UE 115. For example, the L1 of the UE 115 may detect one or more first (e.g., initial) HARQ transmission errors 410 within a first time frame 405-a or within a second time frame 405-b and may send a hole detection 415 notification to the RLC layer of the UE 115.

When configured with multiple CCs, the UE 115 may use one or more techniques as described herein to determine a HARQ RTT for the fast-NACK parameters. For example, if the RLC hole detected by the UE 115 is associated with an L1 indication from two or more CCs, and if each of the two or more CCs has the same numerology, the UE 115 may set the HARQ RTT based on the common numerology of the two or more CCs. If the RLC hole detected by the UE 115 is associated with an L1 indication from two or more CCs, and if each of the two or more CCs have at least one different numerology, the UE 115 may set the HARQ RTT to a highest (e.g., maximum) HARQ RTT across the numerologies of all the CCs associated with the RLC hole. If the L1 indication is from one CC, the UE 115 may set the HARQ RTT based on the numerology of the one CC. Such techniques may extend to carrier aggregation with more than two numerologies (e.g., three or more numerologies).

In some cases (e.g., with multiple CCs or one CC per connection), the network (e.g., the base station 105) may flip a new data indicator (NDI) field before a HARQ process can succeed, or the network may switch a HARD ID for a HARQ process. In such cases, L1 may send an indication to the RLC layer to expire the RLC timer and immediately send an RLC NACK. Before expiring the timer, the UE 115 may ensure that all CCs associated with a HARQ error (e.g., mapped to the RLC hole) have either had a cyclic redundancy check (CRC) success or have failed HARQ.

As described herein, the UE 115 may use the HARQ RTT to determine one or more parameters (e.g., thresholds, timer values) associated with the fast-NACK mode. In such cases, if a threshold (e.g., based on the HARQ RTT) is satisfied (e.g., is met or exceeded), the UE 115 may enter the fast-NACK mode and may set a new RLC timer value based on the HARQ RTT.

Figure 5:
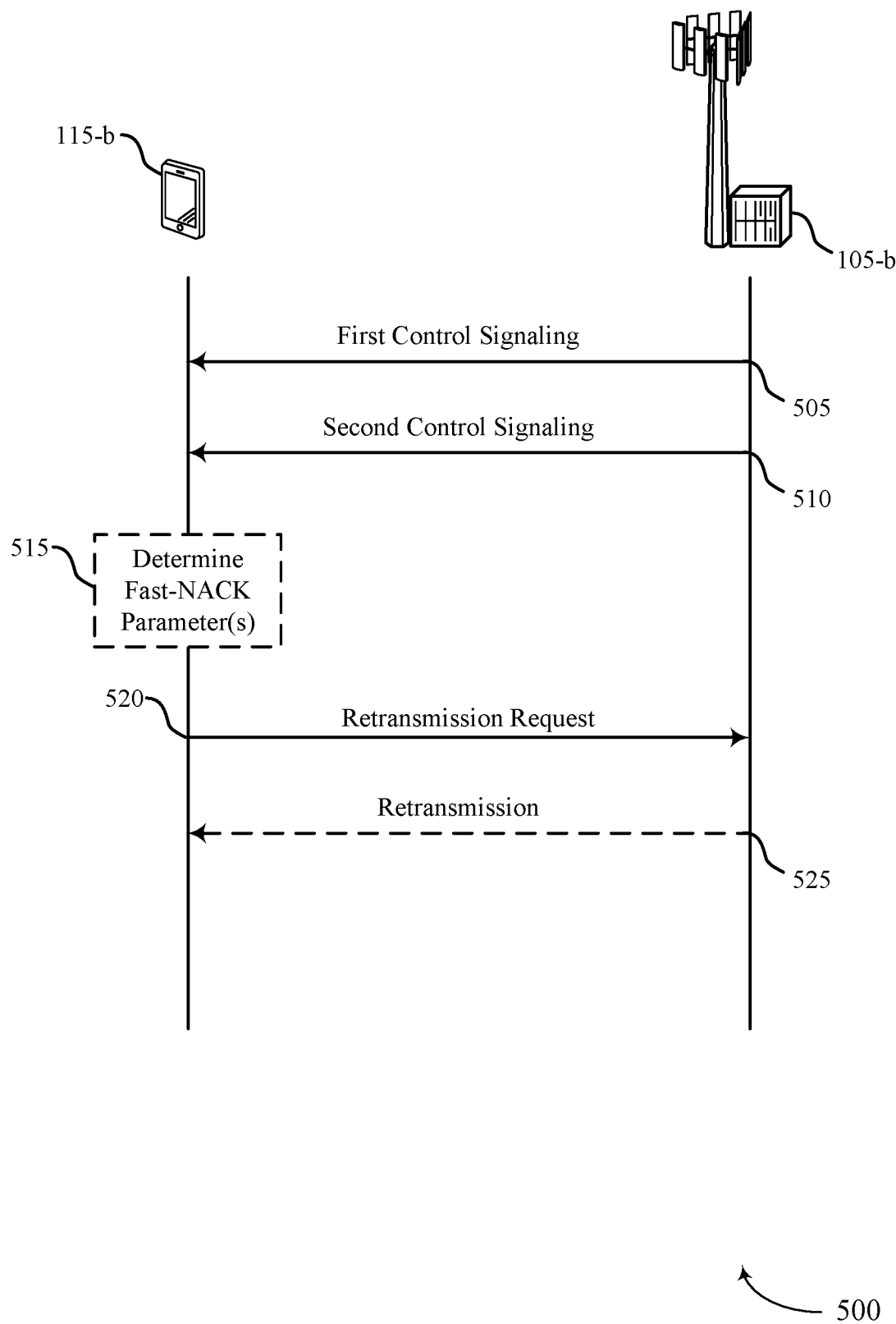
FIG. 5 illustrates an example of a process flow that supports techniques for reducing a feedback time for communications over multiple wireless connections in accordance with aspects of the present disclosure.

FIG. 5 illustrates an example of a process flow 500 that supports techniques for reducing a feedback time for communications over multiple wireless connections in accordance with aspects of the present disclosure. The process flow 500 may illustrate an example of techniques used by a communication system for entering a fast-NACK mode which may, for example, be implemented by a UE 115-b and a base station 105-b. For example, process flow 500 may support transmission of control signaling from base station 105-b to UE 115-b, indicating respective RLC timers for UE 115-b to use RLC NACK procedures. Base station 105-b and UE 115-b may be examples of the corresponding devices described with reference to FIGS. 1-4.

In the following description of process flow 500, the operations may be performed in a different order than the order shown, or the operations performed by UE 115-b and base station 105-b may be performed in different orders or at different times. For example, some operations may also be left out of process flow 500, or other operations may be added to process flow 500. As another example, operations shown as performed in a single instance (e.g., a single transmission) may in some cases be performed as multiple instances (e.g., multiple transmissions) over some duration of time, or multiple transmissions may be combined into a single transmission instance. Although UE 115-b and base station 105-b are shown performing the operations of process flow 500, some aspects of some operations may also be performed by one or more other wireless devices.

At 505, base station 105-b may transmit, to UE 115-b and for a first connection, first control signaling indicating a first retransmission request time duration (e.g., a first RLC timer value) for requesting packet retransmission relative to when a packet (e.g., PDU) in a first subset of a sequence of packets is determined to be unsuccessfully received via the first connection. The first control signaling may, for example, indicate a respective RLC timer value associated with the first connection (e.g., a first wireless connection). The RLC timer may represent a timer triggered by encountering an RLC hole (e.g., a missing packet), whereupon expiration of the timer, UE 115-b may transmit an RLC NACK to base station 105-b. Base station 105-b may transmit the first control signaling to UE 115-b via a downlink control information (DCI) message, RRC signaling, a MAC control element (CE), or any combination thereof, among other examples.

At 510, base station 105-b may transmit, to UE 115-b and for a second connection, second control signaling indicating a second retransmission request time duration (e.g., a second RLC timer value) for requesting packet retransmission relative to when a packet (e.g., PDU) in a second subset of a sequence of packets is determined to be unsuccessfully received via the second connection. The second control signaling may, for example, indicate a respective RLC timer value associated with the second connection (e.g., a second wireless connection). The RLC timer may represent a timer triggered by encountering an RLC hole (e.g., a missing packet), whereupon expiration of the timer, UE 115-b may transmit an RLC NACK to base station 105-b. In some cases, the first and second control signaling may be transmitted separately from base station 105-b, and in some cases, the first and second control signaling may be transmitted together or concurrently. Base station 105-b may transmit the second control signaling to UE 115-b via a DCI message, RRC signaling, a MAC CE, or any combination thereof, among other examples.

At 515, in some cases, UE 115-b may determine one or more fast-NACK parameters as described herein. For example, UE 115-b may determine a value for a first reordering window threshold (e.g., for entering a second level of fast-NACK) and/or may determine a value for a second reordering window threshold (e.g., for entering a third level of fast-NACK). UE 115-b may determine the threshold using the techniques described herein, for example, with reference to FIGS. 2, 3A, and 3B. Additionally, or alternatively, UE 115-b may determine whether the configured timer values (e.g., either of the first and second timer values) satisfy a threshold time for a first level of fast-NACK, as described with reference to FIG. 2. Based on the one or more threshold values, UE 115-b may, in some cases, determine to enter one of the first, second, or third levels of fast-NACK, for example, as described with reference to FIGS. 2, 3A, and 3B. UE 115-b may also determine a new value for the first or second RLC timer based on determining to enter the first, second, or third level of fast-NACK, for example, as described with reference to FIG. 2. The UE 115-b may use a processor, or other general or specific hardware or software (e.g., among other examples described herein), to determine the one or more fast-NACK parameters as described herein.

At 520, UE 115-b may transmit, prior to expiration of the first retransmission request time duration (e.g., the configured RLC timer), a first retransmission request to request retransmission of at least one packet in the first subset of the sequence of packets. For example, UE 115-b may transmit the first retransmission request based on overriding the first retransmission request time duration with a third retransmission request time duration (e.g., a new or shortened RLC timer) for the first connection, where the second retransmission request time duration is maintained for the second connection. As described herein, UE 115-b may override or replace the first time duration (e.g., configured RLC timer) with a new, shorter RLC timer (e.g., the third retransmission request time duration) based on entering the fast-NACK mode. The UE 115-b may override the first time duration, for example, based on the one or more fast-NACK parameters determined at 515. The UE 115-b may transmit the retransmission request to base station 105-b via a physical uplink channel, such as a physical uplink control channel (PUCCH). The UE 115-b may, for example, use configured PUCCH resources or may use allocated PUCCH resources to transmit the retransmission request.

At 525, in some cases, base station 105-b may transmit, to UE 115-b a retransmission of the at least one packet. For example, based on receiving the retransmission request at 520, base station 105-b may retransmit at least one missed packet from the first subset of the sequence of packets to UE 115-b. Base station 105-b may retransmit the packet to UE 115-b via a physical downlink channel, such as a physical downlink shared channel (PDSCH). For example, base station 105-b may use configured PDSCH resources or allocated PDSCH resources to retransmit the packet.

Figure 6:
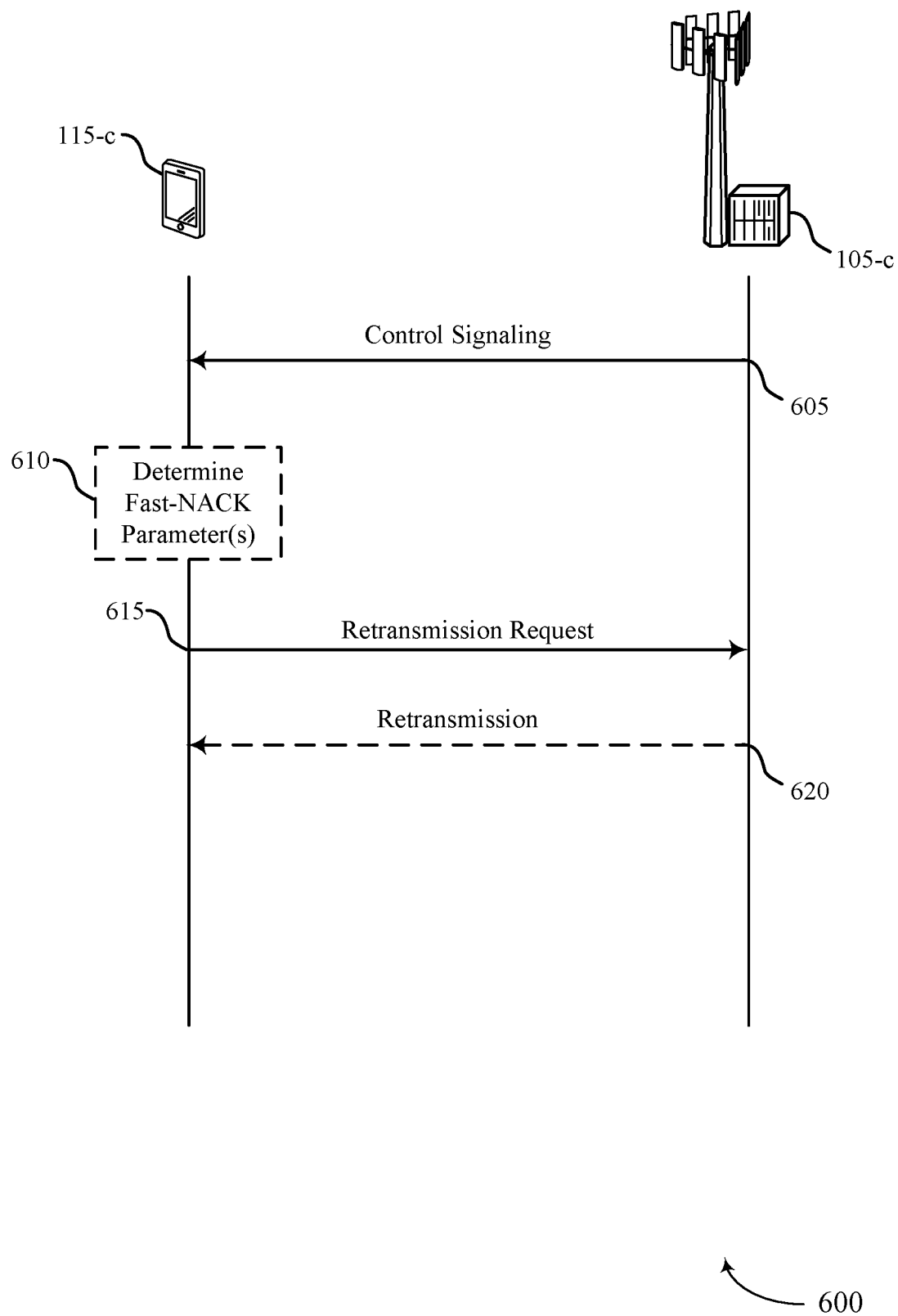
FIG. 6 illustrates an example of a process flow that supports techniques for reducing a feedback time for communications over multiple wireless connections in accordance with aspects of the present disclosure.

FIG. 6 illustrates an example of a process flow 600 that supports techniques for reducing a feedback time for communications over multiple wireless connections in accordance with aspects of the present disclosure. The process flow 600 may illustrate an example of techniques used by a communication system for entering a fast-NACK mode which may, for example, be implemented by a UE 115-c and a base station 105-c. For example, process flow 600 may support transmission of control signaling from base station 105-c to UE 115-c, indicating respective RLC timers for UE 115-c to use RLC NACK procedures. Base station 105-c and UE 115-c may be examples of the corresponding devices described with reference to FIGS. 1-5.

In the following description of process flow 600, the operations may be performed in a different order than the order shown, or the operations performed by UE 115-c and base station 105-c may be performed in different orders or at different times. For example, some operations may also be left out of process flow 600, or other operations may be added to process flow 600. As another example, operations shown as performed in a single instance (e.g., a single transmission) may in some cases be performed as multiple instances (e.g., multiple transmissions) over some duration of time, or multiple transmissions may be combined into a single transmission instance. Although UE 115-c and base station 105-c are shown performing the operations of process flow 600, some aspects of some operations may also be performed by one or more other wireless devices.

At 605, base station 105-c may transmit, to UE 115-c and for a set of multiple CCs, control signaling indicating a first retransmission request time duration (e.g., a first RLC timer value) for requesting packet retransmission relative to when a packet (e.g., PDU) in a sequence of packets is determined to be unsuccessfully received. The control signaling may, for example, indicate a respective RLC timer value associated with the set of multiple CCs (e.g., used over a wireless connection). The RLC timer may represent a timer triggered by encountering an RLC hole (e.g., a missing packet), whereupon expiration of the timer, UE 115-c may transmit an RLC NACK to base station 105-c. Base station 105-c may transmit the control signaling to UE 115-c via a DCI message, RRC signaling, a MAC CE, or any combination thereof, among other examples.

At 610, in some cases, UE 115-c may determine one or more fast-NACK parameters as described herein. For example, UE 115-c may determine a value for a first reordering window threshold (e.g., for entering a second level of fast-NACK) and/or may determine a value for a second reordering window threshold (e.g., for entering a third level of fast-NACK). UE 115-c may determine the threshold using the techniques described herein, for example, with reference to FIGS. 2, 3A, and 3B. Additionally, or alternatively, UE 115-c may determine whether the configured timer values (e.g., either of the first and second timer values) satisfy (e.g., meet or exceed) a threshold for a first level of fast-NACK, as described with reference to FIG. 2. Based on the one or more threshold values, UE 115-c may, in some cases, determine to enter one of the first, second, or third levels of fast-NACK, for example, as described with reference to FIGS. 2, 3A, and 3B. UE 115-c may also determine a new value for the first or second RLC timer based on determining to enter the first, second, or third level of fast-NACK, for example, as described with reference to FIG. 2.

As described herein with reference to FIG. 4, UE 115-c may determine the one or more fast-NACK parameters based on a HARQ RTT associated with a numerology of one of the set of multiple CCs. For example, if an RLC hole (e.g., missed packet) is associated with a single CC, or a group of CCs with a same numerology, UE 115-c may use a corresponding HARQ RTT. If the RLC hole is associated with a group of CCs having at least two different numerologies, UE 115-c may use a HARQ RTT corresponding to a longest or largest (e.g., maximum) HARQ RTT associated with the different numerologies. The UE 115-c may use a processor, or other general or specific hardware or software (e.g., among other examples described herein), to determine the one or more fast-NACK parameters as described herein.

At 615, UE 115-c may transmit, prior to expiration of the first retransmission request time duration (e.g., the configured RLC timer), a first retransmission request to request retransmission of at least one packet in the sequence of packets. For example, UE 115-c may transmit the first retransmission request based on overriding the first retransmission request time duration with a second retransmission request time duration (e.g., a new or shortened RLC timer), where the second retransmission request time duration is based on a respective numerology for one or more CCs of the set of multiple CCs that are associated with the at least one packet. As described herein, UE 115-c may override or replace the first time duration (e.g., configured RLC timer) with a new, shorter RLC timer (e.g., the second retransmission request time duration) based on entering the fast-NACK mode. The UE 115-c may override the first time duration, for example, based on the one or more fast-NACK parameters determined at 610. The UE 115-c may transmit the retransmission request to base station 105-c via a physical uplink channel, such as a PUCCH. The UE 115-b may, for example, use configured PUCCH resources or may use allocated PUCCH resources to transmit the retransmission request.

At 620, in some cases, base station 105-c may transmit, to UE 115-c a retransmission of the at least one packet. For example, based on receiving the retransmission request at 615, base station 105-c may retransmit at least one missed packet from the sequence of packets to UE 115-c. Base station 105-c may retransmit the packet to UE 115-c via a physical downlink channel, such as a PDSCH. For example, base station 105-b may use configured PDSCH resources or allocated PDSCH resources to retransmit the packet.

Figure 7:
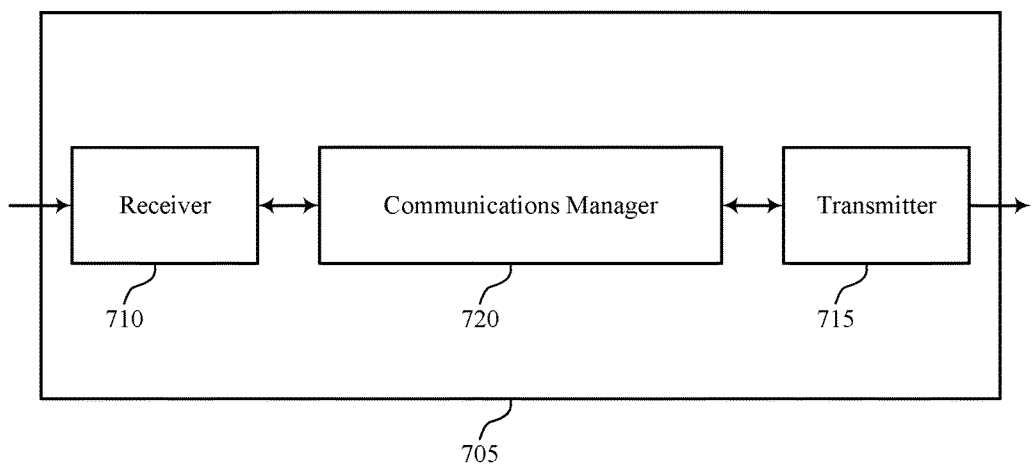
FIGS. 7 and 8 show block diagrams of devices that support techniques for reducing a feedback time for communications over multiple wireless connections in accordance with aspects of the present disclosure.

FIG. 7 shows a block diagram 700 of a device 705 that supports techniques for reducing a feedback time for communications over multiple wireless connections in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for reducing a feedback time for communications over multiple wireless connections). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for reducing a feedback time for communications over multiple wireless connections). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for reducing a feedback time for communications over multiple wireless connections as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, for a first connection, first control signaling indicating a first retransmission request time duration for requesting packet retransmission relative to when a packet in a first subset of a sequence of packets is determined to be unsuccessfully received via the first connection. The communications manager 720 may be configured as or otherwise support a means for receiving, for a second connection, second control signaling indicating a second retransmission request time duration for requesting packet retransmission relative to when a packet in a second subset of the sequence of packets is determined to be unsuccessfully received via the second connection. The communications manager 720 may be configured as or otherwise support a means for transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

Additionally, or alternatively, the communications manager 720 may support wireless communications at a UE in accordance with examples as disclosed herein. For example, the communications manager 720 may be configured as or otherwise support a means for receiving, for a set of multiple component carriers, control signaling that indicates a first retransmission request time duration for requesting packet retransmission relative to when a packet in a sequence of packets is determined to be unsuccessfully received. The communications manager 720 may be configured as or otherwise support a means for transmitting, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more component carriers of the plurality that are associated with the at least one packet.

The actions performed by the communications manager 720, among other examples herein, may be implemented to realize one or more potential advantages. For example, communications manager 720 may increase available battery power and communication quality at a wireless device (e.g., a UE 115) by supporting a fast-NACK mode, which may increase downlink throughput. The associated increase in communication quality may result in increased link performance and decreased overhead based on using the fast-NACK mode for requesting retransmission of a packet from a sequence of packets. Accordingly, communications manager 720 may save power and increase battery life at a wireless device (e.g., a UE 115) by strategically increasing a quality of communications at a wireless device (e.g., a UE 115).

Figure 8:
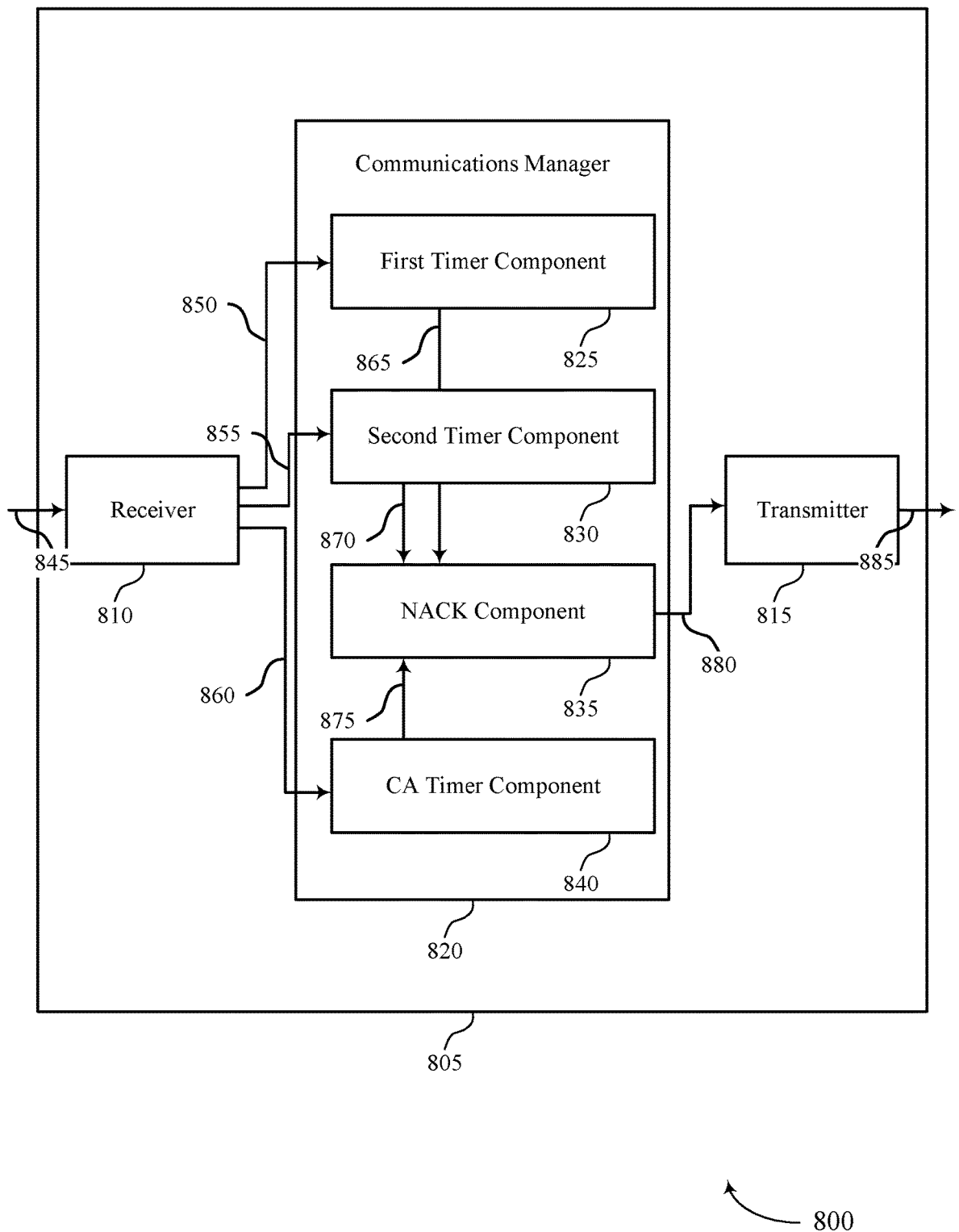

FIG. 8 shows a block diagram 800 of a device 805 that supports techniques for reducing a feedback time for communications over multiple wireless connections in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reducing a feedback time for communications over multiple wireless connections). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reducing a feedback time for communications over multiple wireless connections). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for reducing a feedback time for communications over multiple wireless connections as described herein. For example, the communications manager 820 may include a first timer component 825, a second timer component 830, a NACK component 835, a CA timer component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The UE may receive, via the receiver 810, control signaling 845 from a base station. The control signaling 845 may include first control signaling, second control signaling, or any combination thereof, as described herein. For example, the receiver 810 may be configured as or otherwise support a means for receiving, for a first connection, first control signaling indicating a first retransmission request time duration 850 for requesting packet retransmission relative to when a packet in a first subset of a sequence of packets is determined to be unsuccessfully received via the first connection. The receiver 810 may send the first retransmission request time duration 850 to the first timer component 825.

The receiver 810 may also be configured as or otherwise support a means for receiving for a second connection, second control signaling indicating a second retransmission request time duration 855 for requesting packet retransmission relative to when a packet in a second subset of the sequence of packets is determined to be unsuccessfully received via the second connection. The receiver 810 may send the second retransmission request time duration 855 to the second timer component 830.

The first timer component 825 may determine whether the first retransmission request time duration 850 has expired. Upon expiration, the first timer component 825 may send an indication 865 to the NACK component 835, indicating the expiration of the first retransmission request time duration 850. The NACK component 835 may be configured as or otherwise support a means for receiving the indication 865 and sending a second indication 880 to the transmitter 815, where the second indication 880 may indicate to transmit an RLC NACK. The transmitter 815 may receive the second indication 880 and may transmit, prior to expiration of the first retransmission request time duration 850, a first retransmission request 885 to request retransmission of at least one packet in the first subset of the sequence of packets based on overriding the first retransmission request time duration 850 with a third retransmission request time duration for the first connection, where the second retransmission request time duration 855 is maintained for the second connection.

Similarly, in some cases, the second timer component 830 may determine whether the second retransmission request time duration 855 has expired. Upon expiration, the second timer component 830 may send an indication 870 to the NACK component 835, indicating the expiration of the second retransmission request time duration 855.

Additionally, or alternatively, the communications manager 820 may support wireless communications at a UE in accordance with examples as disclosed herein. The receiver 810 may be configured as or otherwise support a means for receiving, for a set of multiple CCs, control signaling 845 that indicates a first retransmission request time duration 860 for requesting packet retransmission relative to when a packet in a sequence of packets is determined to be unsuccessfully received. The receiver 810 may send the first retransmission request time duration 860 to the CA timer component 840.

The CA timer component 840 may determine whether the first retransmission request time duration 860 has expired. Upon expiration, the CA timer component 840 may send an indication 875 to the NACK component 835, indicating the expiration of the first retransmission request time duration 850. The NACK component 835 may be configured as or otherwise support a means for receiving the indication 875 and sending a second indication 880 to the transmitter 815, where the second indication 880 may indicate to transmit an RLC NACK. The transmitter 815 may receive the second indication 880 and may transmit, prior to expiration of the first retransmission request time duration, a first retransmission request 885 to request retransmission of at least one packet in the sequence of packets based on overriding the first retransmission request time duration 860 with a second retransmission request time duration, where the second retransmission request time duration is based on a respective numerology for one or more CCs of the set that are associated with the at least one packet.

A processor of a wireless device (e.g., controlling the receiver 810, the transmitter 815, or the transceiver 1015 as described with reference to FIG. 10) may increase available battery power and communication quality. The increased communication quality may increase available battery power and throughput (e.g., via implementation of system components described with reference to FIG. 9) compared to other systems and techniques, for example, that do not support entering a fast-NACK mode. Further, the processor of the wireless device may identify one or more aspects (e.g., parameters) of the fast-NACK mode, which may result in increased communication quality, as well as save power and increase battery life at the wireless device (e.g., by strategically supporting a faster RLC NACK time), among other benefits.

Figure 9:
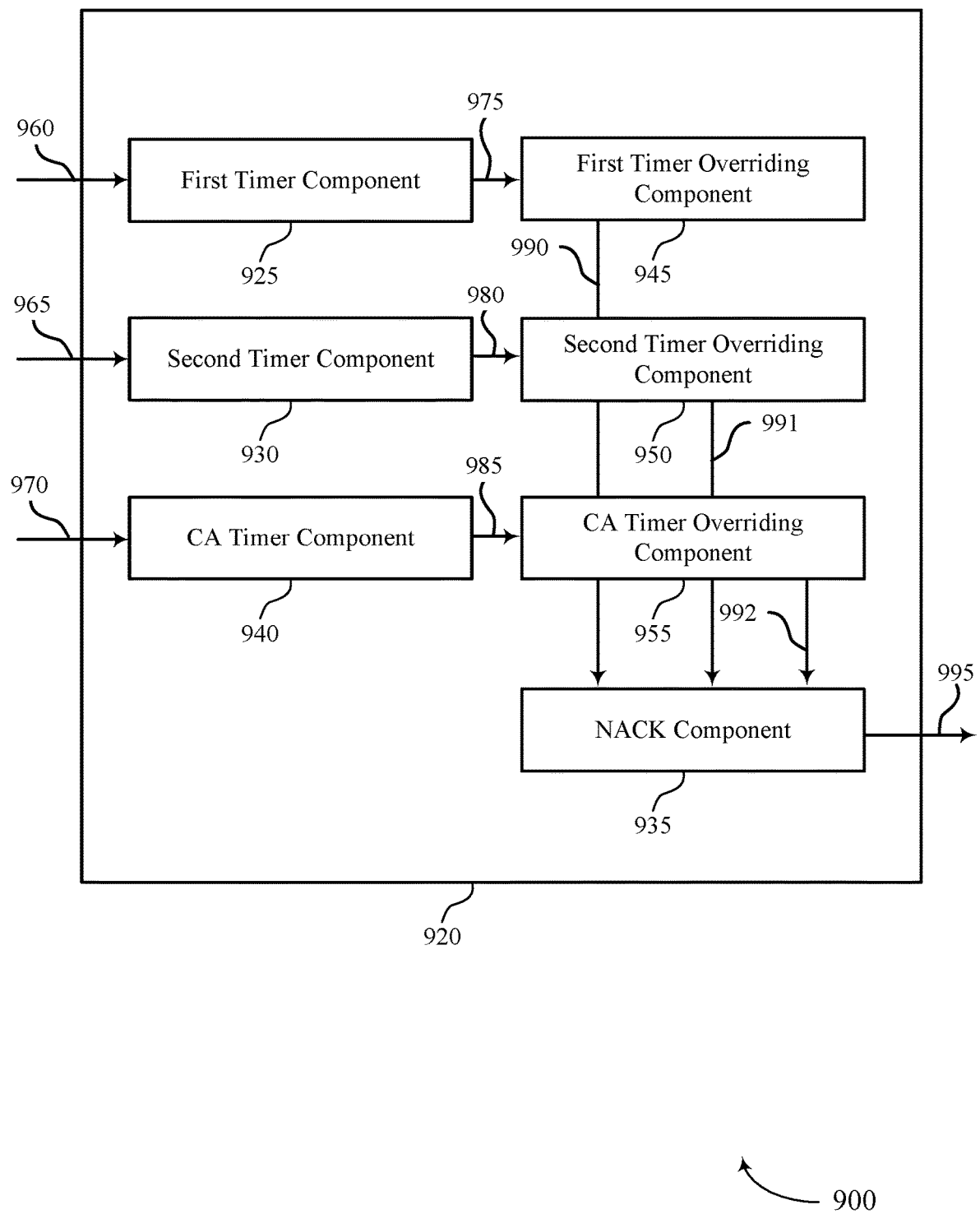
FIG. 9 shows a block diagram of a communications manager that supports techniques for reducing a feedback time for communications over multiple wireless connections in accordance with aspects of the present disclosure.

FIG. 9 shows a block diagram 900 of a communications manager 920 that supports techniques for reducing a feedback time for communications over multiple wireless connections in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for reducing a feedback time for communications over multiple wireless connections as described herein. For example, the communications manager 920 may include a first timer component 925, a second timer component 930, a NACK component 935, a CA timer component 940, a first timer overriding component 945, a second timer overriding component 950, a CA timer overriding component 955, or any combination thereof. Each of these components may communicate, directly or indirectly, with one another (e.g., via one or more buses).

The communications manager 920 may support wireless communications at a UE in accordance with examples as disclosed herein. The first timer component 925 may be configured as or otherwise support a means for receiving, for a first connection, first control signaling 960 indicating a first retransmission request time duration 975 for requesting packet retransmission relative to when a packet in a first subset of a sequence of packets is determined to be unsuccessfully received via the first connection. The first timer component 925 may, for example, receive the first control signaling 960 via a receiver and may send the first retransmission request time duration 975 to the first timer overriding component 945.

The second timer component 930 may be configured as or otherwise support a means for receiving, for a second connection, second control signaling 965 indicating a second retransmission request time duration 980 for requesting packet retransmission relative to when a packet in a second subset of the sequence of packets is determined to be unsuccessfully received via the second connection. The second timer component 930 may, for example, receive the second control signaling 965 via a receiver and may send the second retransmission request time duration 980 to the second timer overriding component 950.

The NACK component 935 may be configured as or otherwise support a means for transmitting, prior to expiration of the first retransmission request time duration 975, a first retransmission request 995 to request retransmission of at least one packet in the first subset of the sequence of packets based on overriding the first retransmission request time duration 975 with a third retransmission request time duration for the first connection, where the second retransmission request time duration 980 is maintained for the second connection. For example, the NACK component 935 may receive an indication 990 from the first timer overriding component 945, indicating for the NACK component 935 to transmit the first retransmission request 995. The NACK component 935 may transmit the first retransmission request 995 via a transmitter.

In some examples, the first timer overriding component 945 may be configured as or otherwise support a means for determining that the first retransmission request time duration satisfies a threshold, where overriding the first retransmission request time duration is based on the determining. In some examples, the first timer overriding component 945 may be configured as or otherwise support a means for determining a first reordering window length for the first subset of the sequence of packets. In some examples, the first timer overriding component 945 may be configured as or otherwise support a means for determining that the first reordering window length satisfies a first threshold associated with the first connection, where overriding the first retransmission request time duration with the third retransmission request time duration is based on determining that the first reordering window length satisfies the first threshold.

In some examples, to support determining the first reordering window length, the first timer overriding component 945 may be configured as or otherwise support a means for identifying a first PDCP sequence number corresponding to a highest radio link control sequence number for the sequence of packets. In some examples, to support determining the first reordering window length, the first timer overriding component 945 may be configured as or otherwise support a means for determining whether a second PDCP sequence number that includes a lowest missing PDCP sequence number from the first subset of the sequence of packets is equal to the first PDCP sequence number plus one.

In some examples, the first timer overriding component 945 may be configured as or otherwise support a means for determining that the second PDCP sequence number is equal to the first PDCP sequence number plus one. In some examples, the first timer overriding component 945 may be configured as or otherwise support a means for setting the first reordering window length to a total reordering window length for the sequence of packets. In some examples, the first timer overriding component 945 may be configured as or otherwise support a means for determining that the second PDCP sequence number is not a next PDCP sequence number following the first PDCP sequence number. In some examples, the first timer overriding component 945 may be configured as or otherwise support a means for setting the first reordering window length to a reordering window length including packets from the sequence of packets associated with sequence numbers greater than the second PDCP sequence number.

In some examples, the first timer overriding component 945 may be configured as or otherwise support a means for determining the third retransmission request time duration based on a first offset and a product of an integer and a HARQ RTT for the first connection, where the integer is associated with a level of the third retransmission request time duration, and where overriding the first retransmission request time duration with the third retransmission request time duration is based on determining the third retransmission request time duration. In some examples, the first timer overriding component 945 may be configured as or otherwise support a means for determining the first threshold based on an available reordering window for the sequence of packets, a retransmission request processing duration, a HARQ RTT for the first connection, or a combined throughput for the first connection and the second connection, where determining that the first reordering window length satisfies the first threshold is based on determining the first threshold.

In some examples, to support determining the first threshold, the first timer overriding component 945 may be configured as or otherwise support a means for determining the first threshold based on an integer multiple of the HARQ RTT. In some examples, to support determining the first threshold, the first timer overriding component 945 may be configured as or otherwise support a means for determining the first threshold for a first DRB of the first connection, where the first reordering window length corresponds to the first DRB, and where the combined throughput is equal to a throughput for one or more DRBs for the first connection and the second connection that excludes a throughput for one or more second DRBs associated with an unacknowledged mode.

In some examples, the first timer overriding component 945 may be configured as or otherwise support a means for determining the available reordering window for the sequence of packets based on an average throughput for each of the one or more DRBs divided by the throughput for the one or more DRBs and a reordering window that excludes packets associated with one or more unacknowledged mode DRBs for the first connection and the second connection, where determining the first threshold is based on determining the available reordering window. In some examples, to support determining the first threshold, the first timer overriding component 945 may be configured as or otherwise support a means for determining the first threshold for a first subscription of the first connection, where the first reordering window length corresponds to the first DRB and the first subscription.

In some examples, to support determining the available reordering window, the first timer overriding component 945 may be configured as or otherwise support a means for determining the available reordering window for the sequence of packets based on an offset associated with a dedicated data subscription, an average throughput for each of the one or more DRBs divided by the throughput for the one or more DRBs, a reordering window independent of one or more unacknowledged mode DRBs for the first connection and the second connection, or a throughput for the first subscription divided by a combined throughput for the first subscription and one or more other subscriptions, where determining the first threshold is based on determining the available reordering window.

Based on the examples described herein, the first timer overriding component 945 may determine whether to override the first retransmission request time duration 975 with the third retransmission request time duration and may determine whether the third retransmission request time duration has expired. If the first timer overriding component 945 determines to override the first retransmission request time duration 975 and determines that the third retransmission request time duration has expired, the first timer overriding component 945 may send the indication 990 to the NACK component 935, indicating for the NACK component 935 to transmit the first retransmission request 995.

In some examples, the NACK component 935 may be configured as or otherwise support a means for setting a time duration for transmitting a next retransmission request for the first connection to the third retransmission request time duration based on overriding the first retransmission request time duration 975 with the third retransmission request time duration.

In some examples, the second timer component 930 may be configured as or otherwise support a means for performing a tune-away procedure for the second connection. In some examples, the first timer overriding component 945 may be configured as or otherwise support a means for reverting to the first retransmission request time duration 975 for the first connection based on performing the tune-away procedure for the second connection.

In some examples, the second timer component 930 may be configured as or otherwise support a means for performing a tune-away procedure for the second connection. In some examples, the NACK component 935 may be configured as or otherwise support a means for disabling retransmission requests that use a retransmission request time duration for the first connection based on performing the tune-away procedure for the second connection.

In some examples, the second timer overriding component 950 may be configured as or otherwise support a means for determining to override the second retransmission request time duration 980 with a fourth retransmission request time duration for the second connection. Based on the examples described herein, the second timer overriding component 950 may determine whether to override the second retransmission request time duration 980 with the fourth retransmission request time duration and may determine whether the fourth retransmission request time duration has expired. If the second timer overriding component 950 determines to override the second retransmission request time duration 980 and determines that the fourth retransmission request time duration has expired, the second timer overriding component 950 may send the indication 991 to the NACK component, indicating for the NACK component to transmit a retransmission request 995.

In some examples, the NACK component 935 may be configured as or otherwise support a means for transmitting, prior to expiration of the second retransmission request time duration, a second retransmission request to request retransmission of at least one packet in the second subset of the sequence of packets based on determining to override the second retransmission request time duration 980 with the fourth retransmission request time duration.

Additionally, or alternatively, the communications manager 920 may support wireless communications at a UE in accordance with examples as disclosed herein. The CA timer component 940 may be configured as or otherwise support a means for receiving, for a set of multiple CCs, control signaling 970 that indicates a first retransmission request time duration 985 for requesting packet retransmission relative to when a packet in a sequence of packets is determined to be unsuccessfully received. The CA timer component 940 may, for example, receive the control signaling 970 via a receiver and may send the first retransmission request time duration 985 to the CA timer overriding component 955.

In some examples, the NACK component 935 may be configured as or otherwise support a means for transmitting, prior to expiration of the first retransmission request time duration 985, a first retransmission request 995 to request retransmission of at least one packet in the sequence of packets based on overriding the first retransmission request time duration 985 with a second retransmission request time duration, where the second retransmission request time duration is based on a respective numerology for one or more CCs of the set that are associated with the at least one packet. For example, the NACK component 935 may receive an indication 992 from the CA timer overriding component 955, indicating for the NACK component 935 to transmit the first retransmission request 995. The NACK component 935 may transmit the first retransmission request 995 via a transmitter.

In some examples, the CA timer overriding component 955 may be configured as or otherwise support a means for determining that the first retransmission request time duration satisfies a threshold, where overriding the first retransmission request time duration is based on the determining. In some examples, the CA timer overriding component 955 may be configured as or otherwise support a means for determining a reordering window length for the sequence of packets. In some examples, the CA timer overriding component 955 may be configured as or otherwise support a means for determining that the reordering window length satisfies a threshold based on determining the reordering window length, where overriding the first retransmission request time duration with the second retransmission request time duration is based on determining that the reordering window length satisfies the threshold.

In some examples, the CA timer overriding component 955 may be configured as or otherwise support a means for determining the second retransmission request time duration based on a first offset and a product of an integer and a HARQ RTT for the one or more CCs, where the integer is associated with a level of the second retransmission request time duration, and where overriding the first retransmission request time duration with the second retransmission request time duration is based on determining the second retransmission request time duration.

In some examples, the CA timer overriding component 955 may be configured as or otherwise support a means for determining the threshold based on an available reordering window for the sequence of packets, a retransmission request processing duration, or a product of a HARQ RTT for the one or more CCs and a throughput associated with the sequence of packets, where determining that the reordering window length satisfies the threshold is based on determining the threshold. In some examples, to support determining the threshold, the CA timer overriding component 955 may be configured as or otherwise support a means for determining the threshold based on an integer multiple of the HARQ RTT.

In some examples, the CA timer overriding component 955 may be configured as or otherwise support a means for determining that the one or more CCs include two or more CCs. In some examples, the CA timer overriding component 955 may be configured as or otherwise support a means for determining that each of the two or more CCs are associated with a same numerology. In some examples, the CA timer overriding component 955 may be configured as or otherwise support a means for setting a HARQ RTT for the one or more CCs based on the two or more CCs being associated with the same numerology, where the threshold and the second retransmission request time duration are based on the HARQ RTT.

In some examples, the CA timer overriding component 955 may be configured as or otherwise support a means for determining that the one or more CCs include two or more CCs. In some examples, the CA timer overriding component 955 may be configured as or otherwise support a means for determining that each of the two or more CCs are associated with at least two different numerologies. In some examples, the CA timer overriding component 955 may be configured as or otherwise support a means for setting a HARQ RTT for the one or more CCs based on a highest HARQ RTT of the two or more CCs, where the threshold and the second retransmission request time duration are based on the HARQ RTT.

In some examples, the CA timer overriding component 955 may be configured as or otherwise support a means for determining that the one or more CCs are one CC. In some examples, the CA timer overriding component 955 may be configured as or otherwise support a means for setting a HARQ RTT for the one or more CCs based on a numerology of the one CC, where the threshold and the second retransmission request time duration are based on the HARQ RTT. In some examples, a HARQ RTT for the one or more CCs is based on the respective numerology for the one or more CCs.

Based on the examples described herein, the CA timer overriding component 955 may determine whether to override the first retransmission request time duration 985 with the second retransmission request time duration and may determine whether the second retransmission request time duration has expired. If the CA timer overriding component 955 determines to override the first retransmission request time duration 985 and determines that the second retransmission request time duration has expired, the CA timer overriding component 955 may send the indication 992 to the NACK component 935, indicating for the NACK component 935 to transmit the first retransmission request 995.

Figure 10:
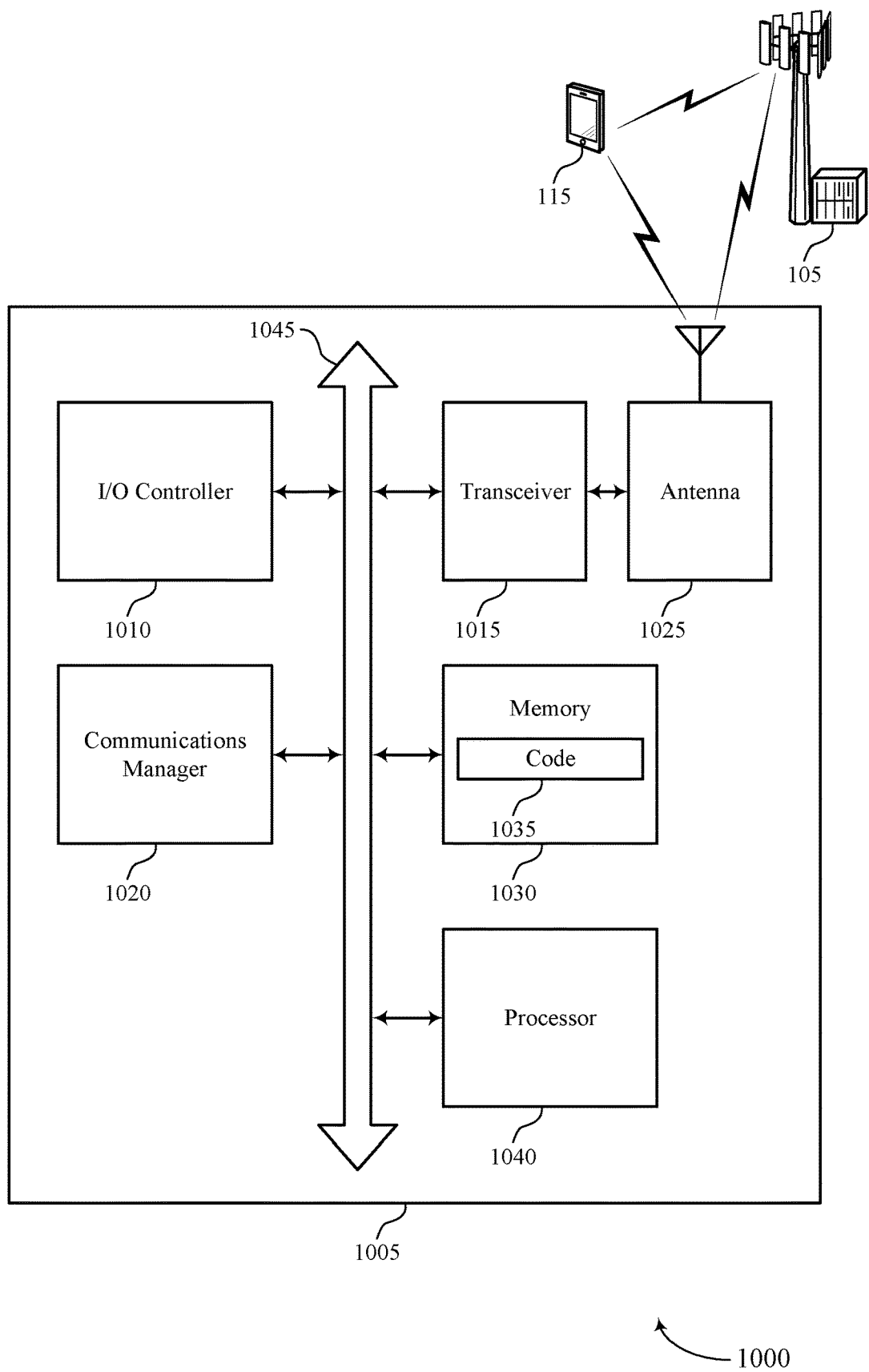
FIG. 10 shows a diagram of a system including a device that supports techniques for reducing a feedback time for communications over multiple wireless connections in accordance with aspects of the present disclosure.

FIG. 10 shows a diagram of a system 1000 including a device 1005 that supports techniques for reducing a feedback time for communications over multiple wireless connections in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for reducing a feedback time for communications over multiple wireless connections). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, for a first connection, first control signaling indicating a first retransmission request time duration for requesting packet retransmission relative to when a packet in a first subset of a sequence of packets is determined to be unsuccessfully received via the first connection. The communications manager 1020 may be configured as or otherwise support a means for receiving, for a second connection, second control signaling indicating a second retransmission request time duration for requesting packet retransmission relative to when a packet in a second subset of the sequence of packets is determined to be unsuccessfully received via the second connection. The communications manager 1020 may be configured as or otherwise support a means for transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection.

Additionally, or alternatively, the communications manager 1020 may support wireless communications at a UE in accordance with examples as disclosed herein. For example, the communications manager 1020 may be configured as or otherwise support a means for receiving, for a set of multiple CCs, control signaling that indicates a first retransmission request time duration for requesting packet retransmission relative to when a packet in a sequence of packets is determined to be unsuccessfully received. The communications manager 1020 may be configured as or otherwise support a means for transmitting, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the set that are associated with the at least one packet.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for reducing a feedback time for communications over multiple wireless connections as described herein, or the processor 1040 and the memory 1030 may be otherwise configured to perform or support such operations.

Figure 11:
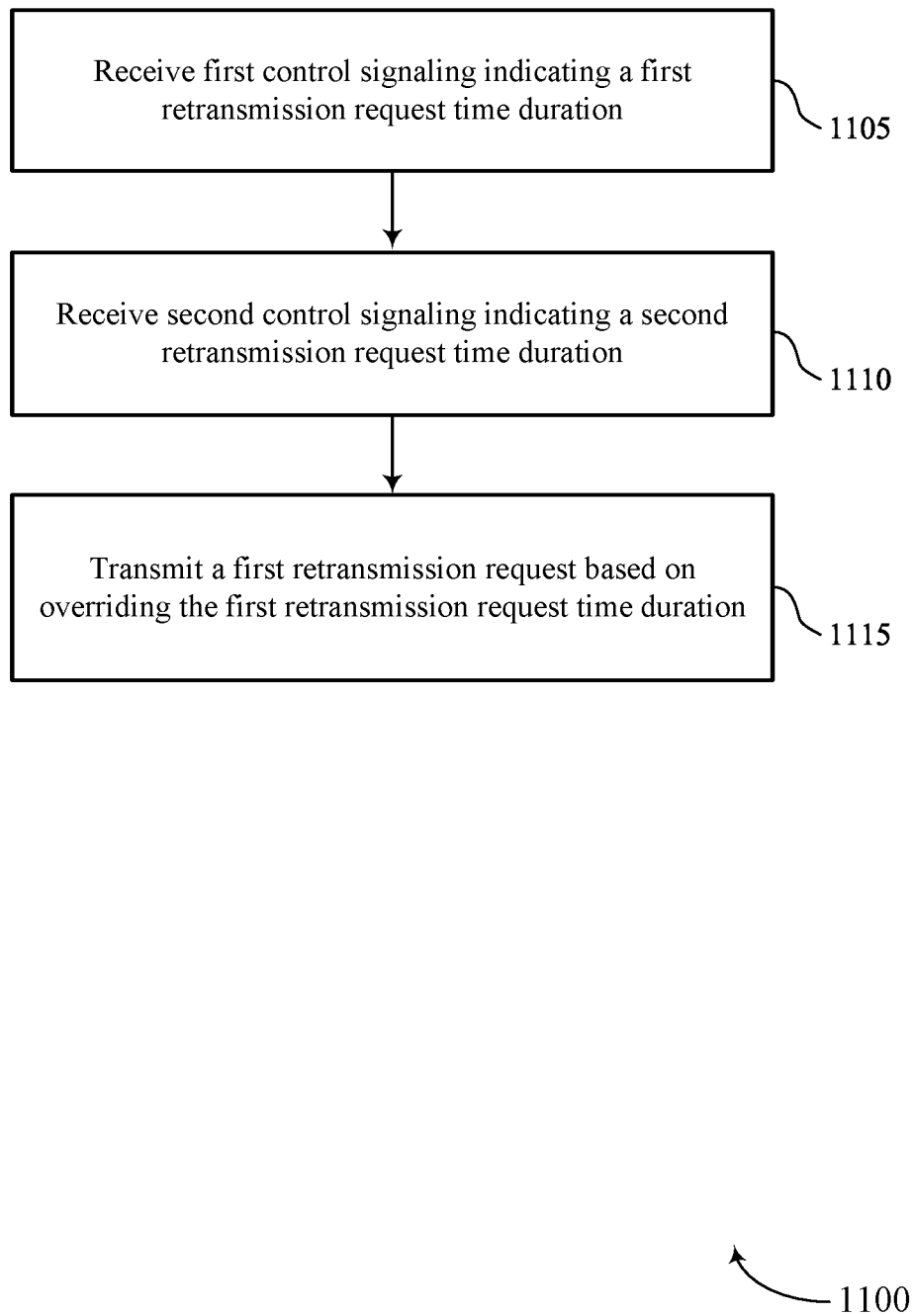
FIGS. 11 through 13 show flowcharts illustrating methods that support techniques for reducing a feedback time for communications over multiple wireless connections in accordance with aspects of the present disclosure.

FIG. 11 shows a flowchart illustrating a method 1100 that supports techniques for reducing a feedback time for communications over multiple wireless connections in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving, for a first connection, first control signaling indicating a first retransmission request time duration for requesting packet retransmission relative to when a packet in a first subset of a sequence of packets is determined to be unsuccessfully received via the first connection. For example, the receiving may include identifying time-frequency resources over which the first control signaling is transmitted, demodulating the first control signaling over those time-frequency resources, and decoding the demodulated signaling to obtain bits that indicate the first retransmission request time duration. The operations of 1105 may be performed in accordance with examples as disclosed herein. In some examples, aspects of the operations of 1105 may be performed by a first timer component 925 as described with reference to FIG. 9.

At 1110, the method may include receiving, for a second connection, second control signaling indicating a second retransmission request time duration for requesting packet retransmission relative to when a packet in a second subset of the sequence of packets is determined to be unsuccessfully received via the second connection. For example, the receiving may include identifying time-frequency resources over which the second control signaling is transmitted, demodulating the second control signaling over those time-frequency resources, and decoding the demodulated signaling to obtain bits that indicate the second retransmission request time duration. The operations of 1110 may be performed in accordance with examples as disclosed herein.

In some examples, aspects of the operations of 1110 may be performed by a second timer component 930 as described with reference to FIG. 9.

At 1115, the method may include transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection. For example, the transmitting may include identifying time-frequency resources over which the first retransmission request is to be transmitted, encoding bits indicating the first retransmission request, and modulating the encoded bits over the time-frequency resources. The operations of 1115 may be performed in accordance with examples as disclosed herein. In some examples, aspects of the operations of 1115 may be performed by a NACK component 935 as described with reference to FIG. 9.

Figure 12:
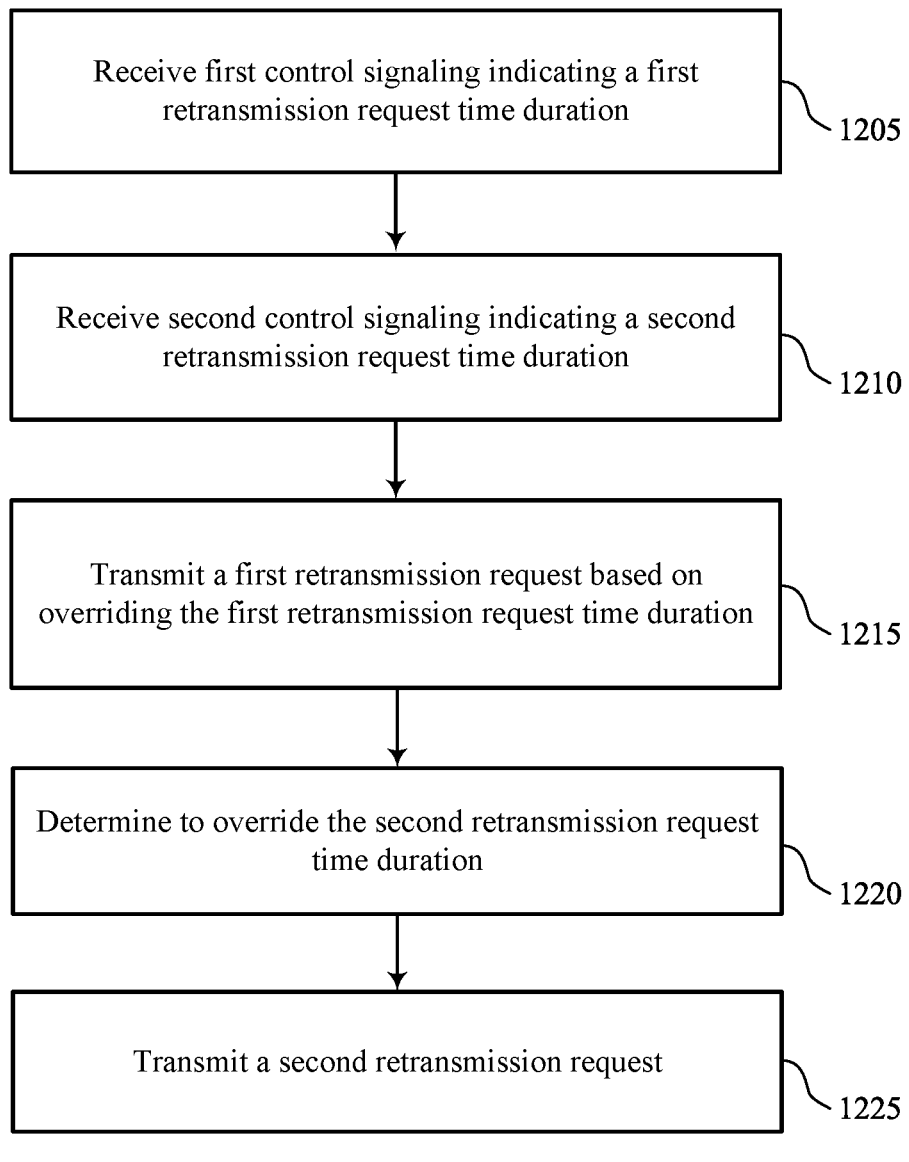

FIG. 12 shows a flowchart illustrating a method 1200 that supports techniques for reducing a feedback time for communications over multiple wireless connections in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving, for a first connection, first control signaling indicating a first retransmission request time duration for requesting packet retransmission relative to when a packet in a first subset of a sequence of packets is determined to be unsuccessfully received via the first connection. For example, the receiving may include identifying time-frequency resources over which the first control signaling is transmitted, demodulating the first control signaling over those time-frequency resources, and decoding the demodulated signaling to obtain bits that indicate the first retransmission request time duration. The operations of 1205 may be performed in accordance with examples as disclosed herein. In some examples, aspects of the operations of 1205 may be performed by a first timer component 925 as described with reference to FIG. 9.

At 1210, the method may include receiving, for a second connection, second control signaling indicating a second retransmission request time duration for requesting packet retransmission relative to when a packet in a second subset of the sequence of packets is determined to be unsuccessfully received via the second connection. For example, the receiving may include identifying time-frequency resources over which the second control signaling is transmitted, demodulating the second control signaling over those time-frequency resources, and decoding the demodulated signaling to obtain bits that indicate the second retransmission request time duration. The operations of 1210 may be performed in accordance with examples as disclosed herein. In some examples, aspects of the operations of 1210 may be performed by a second timer component 930 as described with reference to FIG. 9.

At 1215, the method may include transmitting, prior to expiration of the first retransmission request time duration, a first retransmission request to request retransmission of at least one packet in the first subset of the sequence of packets based on overriding the first retransmission request time duration with a third retransmission request time duration for the first connection, where the second retransmission request time duration is maintained for the second connection. For example, the transmitting may include identifying time-frequency resources over which the first retransmission request is to be transmitted, encoding bits indicating the first retransmission request, and modulating the encoded bits over the time-frequency resources. The operations of 1215 may be performed in accordance with examples as disclosed herein. In some examples, aspects of the operations of 1215 may be performed by a NACK component 935 as described with reference to FIG. 9.

At 1220, the method may include determining to override the second retransmission request time duration with a fourth retransmission request time duration for the second connection. For example, the determining may include using a processor (e.g., or other hardware and/or software) to determine one or more thresholds for entering a fast-NACK mode, and to determine whether the one or more thresholds are met. If one of the thresholds is met, the processor may determine to enter the fast-NACK mode and override the second retransmission request time duration with the fourth retransmission request time duration, and may further determine the fourth retransmission request time duration. The operations of 1220 may be performed in accordance with examples as disclosed herein. In some examples, aspects of the operations of 1220 may be performed by a second timer overriding component 950 as described with reference to FIG. 9.

At 1225, the method may include transmitting, prior to expiration of the second retransmission request time duration, a second retransmission request to request retransmission of at least one packet in the second subset of the sequence of packets based on determining to override the second retransmission request time duration with the fourth retransmission request time duration. For example, the transmitting may include identifying time-frequency resources over which the second retransmission request is to be transmitted, encoding bits indicating the second retransmission request, and modulating the encoded bits over the time-frequency resources. The operations of 1225 may be performed in accordance with examples as disclosed herein. In some examples, aspects of the operations of 1225 may be performed by a NACK component 935 as described with reference to FIG. 9.

Figure 13:
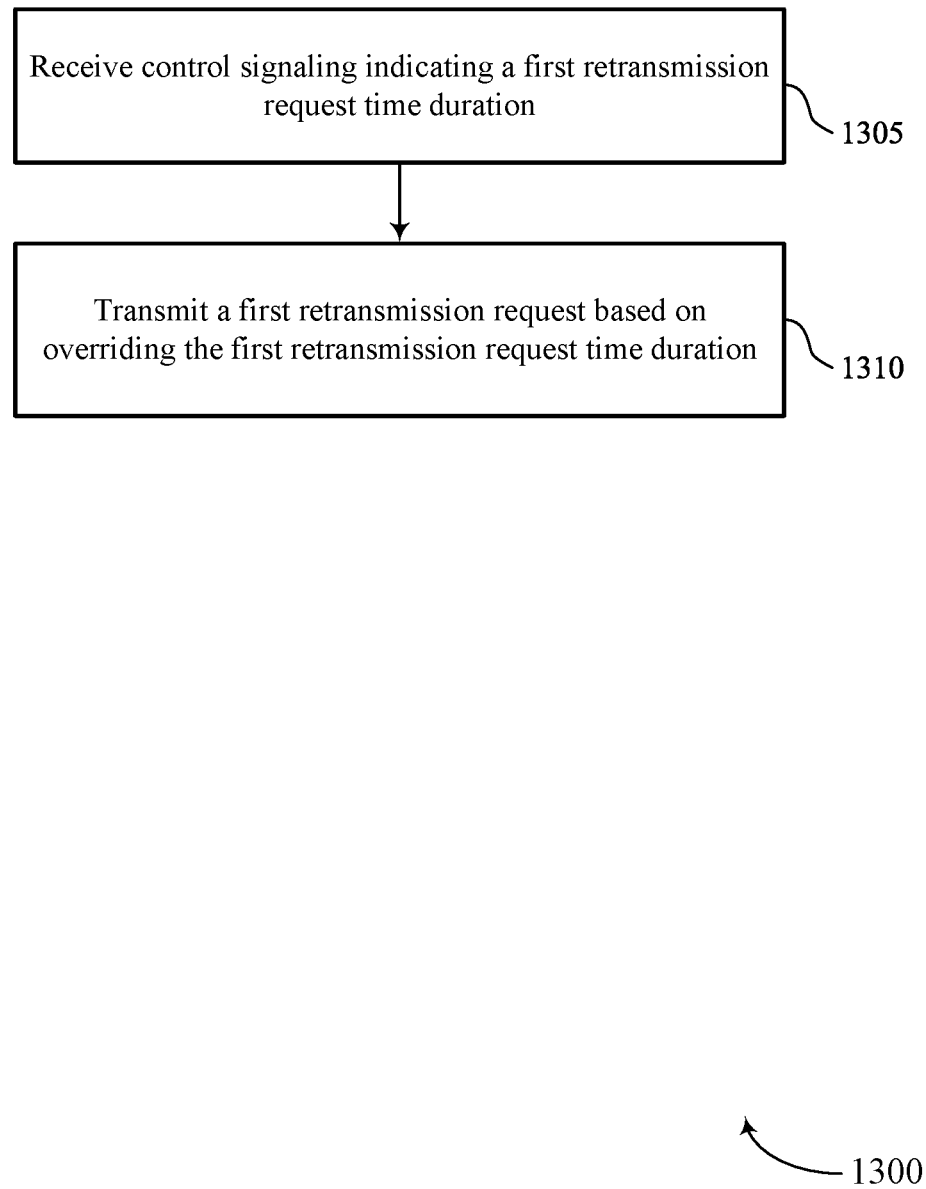

FIG. 13 shows a flowchart illustrating a method 1300 that supports techniques for reducing a feedback time for communications over multiple wireless connections in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving, for a set of multiple CCs, control signaling that indicates a first retransmission request time duration for requesting packet retransmission relative to when a packet in a sequence of packets is determined to be unsuccessfully received. For example, the receiving may include identifying time-frequency resources over which the control signaling is transmitted, demodulating the control signaling over those time-frequency resources, and decoding the demodulated signaling to obtain bits that indicate the first retransmission request time duration. The operations of 1305 may be performed in accordance with examples as disclosed herein. In some examples, aspects of the operations of 1305 may be performed by a CA timer component 940 as described with reference to FIG. 9.

At 1310, the method may include transmitting, prior to expiration of the first retransmission request time duration, a first retransmission request to request retransmission of at least one packet in the sequence of packets based on overriding the first retransmission request time duration with a second retransmission request time duration, where the second retransmission request time duration is based on a respective numerology for one or more CCs of the set that are associated with the at least one packet. For example, the transmitting may include identifying time-frequency resources over which the first retransmission request is to be transmitted, encoding bits indicating the first retransmission request, and modulating the encoded bits over the time-frequency resources. The operations of 1310 may be performed in accordance with examples as disclosed herein. In some examples, aspects of the operations of 1310 may be performed by a NACK component 935 as described with reference to FIG. 9.

The following provides an overview of aspects of the present disclosure:

Aspect 1: A method for wireless communications at a UE, comprising: receiving, for a first connection, first control signaling indicating a first retransmission request time duration for requesting packet retransmission relative to when a packet in a first subset of a sequence of packets is determined to be unsuccessfully received via the first connection; receiving, for a second connection, second control signaling indicating a second retransmission request time duration for requesting packet retransmission relative to when a packet in a second subset of the sequence of packets is determined to be unsuccessfully received via the second connection; and transmitting, prior to expiration of the first retransmission request time duration, a first retransmission request to request retransmission of at least one packet in the first subset of the sequence of packets based at least in part on overriding the first retransmission request time duration with a third retransmission request time duration for the first connection, wherein the second retransmission request time duration is maintained for the second connection.

Aspect 2: The method of aspect 1, further comprising: determining that the first retransmission request time duration satisfies a threshold, wherein overriding the first retransmission request time duration is based at least in part on the determining.

Aspect 3: The method of any of aspects 1 through 2, further comprising: determining a first reordering window length for the first subset of the sequence of packets; and determining that the first reordering window length satisfies a first threshold associated with the first connection, wherein overriding the first retransmission request time duration with the third retransmission request time duration is based at least in part on determining that the first reordering window length satisfies the first threshold.

Aspect 4: The method of aspect 3, wherein determining the first reordering window length comprises: identifying a first PDCP sequence number corresponding to a highest radio link control sequence number for the sequence of packets; and determining whether a second PDCP sequence number that comprises a lowest missing PDCP sequence number from the first subset of the sequence of packets is equal to the first PDCP sequence number plus one.

Aspect 5: The method of aspect 4, further comprising: determining that the second PDCP sequence number is equal to the first PDCP sequence number plus one; and setting the first reordering window length to a total reordering window length for the sequence of packets.

Aspect 6: The method of aspect 4, further comprising: determining that the second PDCP sequence number is not a next PDCP sequence number following the first PDCP sequence number; and setting the first reordering window length to a reordering window length comprising packets from the sequence of packets associated with sequence numbers greater than the second PDCP sequence number.

Aspect 7: The method of any of aspects 3 through 6, further comprising: determining the third retransmission request time duration based at least in part on a first offset and a product of an integer and a HARQ RTT for the first connection, wherein the integer is associated with a level of the third retransmission request time duration, and wherein overriding the first retransmission request time duration with the third retransmission request time duration is based at least in part on determining the third retransmission request time duration.

Aspect 8: The method of any of aspects 3 through 7, further comprising: determining the first threshold based at least in part on an available reordering window for the sequence of packets, a retransmission request processing duration, a HARQ RTT for the first connection, or a combined throughput for the first connection and the second connection, wherein determining that the first reordering window length satisfies the first threshold is based at least in part on determining the first threshold.

Aspect 9: The method of aspect 8, wherein determining the first threshold comprises: determining the first threshold based at least in part on an integer multiple of the HARQ RTT.

Aspect 10: The method of any of aspects 8 through 9, wherein determining the first threshold comprises: determining the first threshold for a first DRB of the first connection, wherein the first reordering window length corresponds to the first DRB, and wherein the combined throughput is equal to a throughput for one or more DRBs for the first connection and the second connection that excludes a throughput for one or more second DRBs associated with an unacknowledged mode.

Aspect 11: The method of aspect 10, further comprising: determining the available reordering window for the sequence of packets based at least in part on an average throughput for each of the one or more DRBs divided by the throughput for the one or more DRBs and a reordering window that excludes packets associated with one or more unacknowledged mode DRBs for the first connection and the second connection, wherein determining the first threshold is based at least in part on determining the available reordering window.

Aspect 12: The method of any of aspects 10 through 11, wherein determining the first threshold further comprises: determining the first threshold for a first subscription of the first connection, wherein the first reordering window length corresponds to the first DRB and the first subscription.

Aspect 13: The method of aspect 12, wherein determining the available reordering window comprises: determining the available reordering window for the sequence of packets based at least in part on an offset associated with a dedicated data subscription, an average throughput for each of the one or more DRBs divided by the throughput for the one or more DRBs, a reordering window independent of one or more unacknowledged mode DRBs for the first connection and the second connection, or a throughput for the first subscription divided by a combined throughput for the first subscription and one or more other subscriptions, wherein determining the first threshold is based at least in part on determining the available reordering window.

Aspect 14: The method of any of aspects 1 through 13, further comprising: setting a time duration for transmitting a next retransmission request for the first connection to the third retransmission request time duration based at least in part on overriding the first retransmission request time duration with the third retransmission request time duration.

Aspect 15: The method of any of aspects 1 through 14, further comprising: performing a tune-away procedure for the second connection; and reverting to the first retransmission request time duration for the first connection based at least in part on performing the tune-away procedure for the second connection.

Aspect 16: The method of any of aspects 1 through 14, further comprising: performing a tune-away procedure for the second connection; and disabling retransmission requests that use a retransmission request time duration for the first connection based at least in part on performing the tune-away procedure for the second connection.

Aspect 17: The method of any of aspects 1 through 16, further comprising: determining to override the second retransmission request time duration with a fourth retransmission request time duration for the second connection; and transmitting, prior to expiration of the second retransmission request time duration, a second retransmission request to request retransmission of at least one packet in the second subset of the sequence of packets based at least in part on determining to override the second retransmission request time duration with the fourth retransmission request time duration.

Aspect 18: The method of any of aspects 1 through 17, further comprising: determining that the third retransmission request time duration has expired based at least in part on overriding the first retransmission request time duration with the third retransmission request time duration; and restarting the third retransmission request time duration based at least in part on an arrival of a next packet in the sequence of packets via the first connection.

Aspect 19: The method of any of aspects 1 through 17, further comprising: determining that the third retransmission request time duration has expired based at least in part on overriding the first retransmission request time duration with the third retransmission request time duration; and restarting the third retransmission request time duration based at least in part on determining that the third retransmission request time duration has expired.

Aspect 20: A method for wireless communications at a UE, comprising: receiving, for a plurality of CCs, control signaling that indicates a first retransmission request time duration for requesting packet retransmission relative to when a packet in a sequence of packets is determined to be unsuccessfully received; and transmitting, prior to expiration of the first retransmission request time duration, a first retransmission request to request retransmission of at least one packet in the sequence of packets based at least in part on overriding the first retransmission request time duration with a second retransmission request time duration, wherein the second retransmission request time duration is based at least in part on a respective numerology for one or more CCs of the plurality that are associated with the at least one packet.

Aspect 21: The method of aspect 20, further comprising: determining that the first retransmission request time duration satisfies a threshold, wherein overriding the first retransmission request time duration is based at least in part on the determining.

Aspect 22: The method of any of aspects 20 through 21, further comprising: determining a reordering window length for the sequence of packets; determining that the reordering window length satisfies a threshold based at least in part on determining the reordering window length, wherein overriding the first retransmission request time duration with the second retransmission request time duration is based at least in part on determining that the reordering window length satisfies the threshold.

Aspect 23: The method of aspect 22, further comprising: determining the second retransmission request time duration based at least in part on a first offset and a product of an integer and a HARQ RTT for the one or more CCs, wherein the integer is associated with a level of the second retransmission request time duration, and wherein overriding the first retransmission request time duration with the second retransmission request time duration is based at least in part on determining the second retransmission request time duration.

Aspect 24: The method of any of aspects 22 through 23, further comprising: determining the threshold based at least in part on an available reordering window for the sequence of packets, a retransmission request processing duration, or a product of a HARQ RTT for the one or more CCs and a throughput associated with the sequence of packets, wherein determining that the reordering window length satisfies the threshold is based at least in part on determining the threshold.

Aspect 25: The method of aspect 24, wherein determining the threshold comprises: determining the threshold based at least in part on an integer multiple of the HARQ RTT.

Aspect 26: The method of any of aspects 22 through 25, further comprising: determining that the one or more CCs comprise two or more CCs; determining that each of the two or more CCs are associated with a same numerology; and setting a HARQ RTT for the one or more CCs based at least in part on the two or more CCs being associated with the same numerology, wherein the threshold and the second retransmission request time duration are based at least in part on the HARQ RTT.

Aspect 27: The method of any of aspects 22 through 25, further comprising: determining that the one or more CCs comprise two or more CCs; determining that each of the two or more CCs are associated with at least two different numerologies; and setting a HARQ RTT for the one or more CCs based at least in part on a highest HARQ RTT of the two or more CCs, wherein the threshold and the second retransmission request time duration are based at least in part on the HARQ RTT.

Aspect 28: The method of any of aspects 22 through 25, further comprising: determining that the one or more CCs are one CC; and setting a HARQ RTT for the one or more CCs based at least in part on a numerology of the one CC, wherein the threshold and the second retransmission request time duration are based at least in part on the HARQ RTT.

Aspect 29: The method of any of aspects 22 through 28, wherein a HARQ RTT for the one or more CCs is based at least in part on the respective numerology for the one or more CCs.

Aspect 30: An apparatus for wireless communications at a UE, comprising a processor; memory coupled with the processor; and instructions stored in the memory and executable by the processor to cause the apparatus to perform a method of any of aspects 1 through 19.

Aspect 31: An apparatus for wireless communications at a UE, comprising at least one means for performing a method of any of aspects 1 through 19.

Aspect 32: A non-transitory computer-readable medium storing code for wireless communications at a UE, the code comprising instructions executable by a processor to perform a method of any of aspects 1 through 19.

Aspect 33: An apparatus for wireless communications at a UE, comprising a processor; memory coupled with the processor; and instructions stored in the memory and executable by the processor to cause the apparatus to perform a method of any of aspects 20 through 29.

Aspect 34: An apparatus for wireless communications at a UE, comprising at least one means for performing a method of any of aspects 20 through 29.

Aspect 35: A non-transitory computer-readable medium storing code for wireless communications at a UE, the code comprising instructions executable by a processor to perform a method of any of aspects 20 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive, for a first connection, first control signaling indicating a first retransmission request time duration for requesting packet retransmission relative to when a packet in a first subset of a sequence of packets is determined to be unsuccessfully received via the first connection;
      receive, for a second connection, second control signaling indicating a second retransmission request time duration for requesting packet retransmission relative to when a packet in a second subset of the sequence of packets is determined to be unsuccessfully received via the second connection;
      determine that a first reordering window length for the first subset of the sequence of packets satisfies a first threshold associated with the first connection; and
      transmit, prior to expiration of the first retransmission request time duration, a first retransmission request to request retransmission of at least one packet in the first subset of the sequence of packets based at least in part on overriding the first retransmission request time duration with a third retransmission request time duration for the first connection, wherein overriding the first retransmission request time duration with the third retransmission request time duration is based at least in part on determining that the first reordering window length satisfies the first threshold, wherein the second retransmission request time duration is maintained for the second connection.

2. The apparatus of claim 1, wherein the instructions are further executable by the processor to cause the apparatus to:
   determine that the first retransmission request time duration satisfies a second threshold, wherein overriding the first retransmission request time duration is based at least in part on the determining.

3. The apparatus of claim 1, wherein the instructions to determine the first reordering window length are executable by the processor to cause the apparatus to:
  identify a first packet data convergence protocol sequence number corresponding to a highest radio link control sequence number for the sequence of packets; and
  determine whether a second packet data convergence protocol sequence number that comprises a lowest missing packet data convergence protocol sequence number from the first subset of the sequence of packets is equal to the first packet data convergence protocol sequence number plus one.

4. The apparatus of claim 3, wherein the instructions are further executable by the processor to cause the apparatus to:
  determine that the second packet data convergence protocol sequence number is equal to the first packet data convergence protocol sequence number plus one; and
  set the first reordering window length to a total reordering window length for the sequence of packets.

5. The apparatus of claim 3, wherein the instructions are further executable by the processor to cause the apparatus to:
  determine that the second packet data convergence protocol sequence number is not a next packet data convergence protocol sequence number following the first packet data convergence protocol sequence number; and
  set the first reordering window length to a reordering window length comprising packets from the sequence of packets associated with sequence numbers greater than the second packet data convergence protocol sequence number.

6. The apparatus of claim 1, wherein the instructions are further executable by the processor to cause the apparatus to:
  determine the third retransmission request time duration based at least in part on a first offset and a product of an integer and a hybrid automatic repeat request round trip time for the first connection, wherein the integer is associated with a level of the third retransmission request time duration, and wherein overriding the first retransmission request time duration with the third retransmission request time duration is based at least in part on determining the third retransmission request time duration.

7. The apparatus of claim 1, wherein the instructions are further executable by the processor to cause the apparatus to:
  determine the first threshold based at least in part on an available reordering window for the sequence of packets, a retransmission request processing duration, a hybrid automatic repeat request round trip time for the first connection, or a combined throughput for the first connection and the second connection, wherein determining that the first reordering window length satisfies the first threshold is based at least in part on determining the first threshold.

8. The apparatus of claim 7, wherein the instructions to determine the first threshold are executable by the processor to cause the apparatus to:
  determine the first threshold based at least in part on an integer multiple of the hybrid automatic repeat request round trip time.

9. The apparatus of claim 7, wherein the instructions to determine the first threshold are executable by the processor to cause the apparatus to:
  determine the first threshold for a first data radio bearer of the first connection, wherein the first reordering window length corresponds to the first data radio bearer, and wherein the combined throughput is equal to a throughput for one or more data radio bearers for the first connection and the second connection that excludes a throughput for one or more second data radio bearers associated with an unacknowledged mode.

10. The apparatus of claim 9, wherein the instructions are further executable by the processor to cause the apparatus to:
  determine the available reordering window for the sequence of packets based at least in part on an average throughput for each of the one or more data radio bearers divided by the throughput for the one or more data radio bearers and a reordering window that excludes packets associated with one or more unacknowledged mode data radio bearers for the first connection and the second connection, wherein determining the first threshold is based at least in part on determining the available reordering window.

11. The apparatus of claim 9, wherein the instructions to determine the first threshold are further executable by the processor to cause the apparatus to:
  determine the first threshold for a first subscription of the first connection, wherein the first reordering window length corresponds to the first data radio bearer and the first subscription.

12. The apparatus of claim 11, wherein the instructions to determine the available reordering window are executable by the processor to cause the apparatus to:
  determine the available reordering window for the sequence of packets based at least in part on an offset associated with a dedicated data subscription, an average throughput for each of the one or more data radio bearers divided by the throughput for the one or more data radio bearers, a reordering window independent of one or more unacknowledged mode data radio bearers for the first connection and the second connection, or a throughput for the first subscription divided by a combined throughput for the first subscription and one or more other subscriptions, wherein determining the first threshold is based at least in part on determining the available reordering window.

13. The apparatus of claim 1, wherein the instructions are further executable by the processor to cause the apparatus to:
  set a time duration for transmitting a next retransmission request for the first connection to the third retransmission request time duration based at least in part on overriding the first retransmission request time duration with the third retransmission request time duration.

14. The apparatus of claim 1, wherein the instructions are further executable by the processor to cause the apparatus to:
  perform a tune-away procedure for the second connection; and
  revert to the first retransmission request time duration for the first connection based at least in part on performing the tune-away procedure for the second connection.

15. The apparatus of claim 1, wherein the instructions are further executable by the processor to cause the apparatus to:
  perform a tune-away procedure for the second connection; and
  disable retransmission requests that use a retransmission request time duration for the first connection based at least in part on performing the tune-away procedure for the second connection.

16. The apparatus of claim 1, wherein the instructions are further executable by the processor to cause the apparatus to:
  determine to override the second retransmission request time duration with a fourth retransmission request time duration for the second connection; and transmit, prior to expiration of the second retransmission request time duration, a second retransmission request to request retransmission of at least one packet in the second subset of the sequence of packets based at least in part on determining to override the second retransmission request time duration with the fourth retransmission request time duration.

17. The apparatus of claim 1, wherein the instructions are further executable by the processor to cause the apparatus to:
determine that the third retransmission request time duration has expired based at least in part on overriding the first retransmission request time duration with the third retransmission request time duration; and
restart the third retransmission request time duration based at least in part on an arrival of a next packet in the sequence of packets via the first connection.

18. The apparatus of claim 1, wherein the instructions are further executable by the processor to cause the apparatus to:
determine that the third retransmission request time duration has expired based at least in part on overriding the first retransmission request time duration with the third retransmission request time duration; and
restart the third retransmission request time duration based at least in part on determining that the third retransmission request time duration has expired.

19. A method for wireless communications at a user equipment (UE), comprising:
receiving, for a first connection, first control signaling indicating a first retransmission request time duration for requesting packet retransmission relative to when a packet in a first subset of a sequence of packets is determined to be unsuccessfully received via the first connection;
receiving, for a second connection, second control signaling indicating a second retransmission request time duration for requesting packet retransmission relative to when a packet in a second subset of the sequence of packets is determined to be unsuccessfully received via the second connection;
determining that a first reordering window length for the first subset of the sequence of packets satisfies a first threshold associated with the first connection; and
transmitting, prior to expiration of the first retransmission request time duration, a first retransmission request to request retransmission of at least one packet in the first subset of the sequence of packets based at least in part on overriding the first retransmission request time duration with a third retransmission request time duration for the first connection, wherein overriding the first retransmission request time duration with the third retransmission request time duration is based at least in part on determining that the first reordering window length satisfies the first threshold, wherein the second retransmission request time duration is maintained for the second connection.

20. The method of claim 19, further comprising:
determining that the first retransmission request time duration satisfies a second threshold, wherein overriding the first retransmission request time duration is based at least in part on the determining.

21. The method of claim 19, wherein determining the first reordering window length comprises:
identifying a first packet data convergence protocol sequence number corresponding to a highest radio link control sequence number for the sequence of packets; and
determining whether a second packet data convergence protocol sequence number that comprises a lowest missing packet data convergence protocol sequence number from the first subset of the sequence of packets is equal to the first packet data convergence protocol sequence number plus one.

22. The method of claim 21, further comprising:
determining that the second packet data convergence protocol sequence number is equal to the first packet data convergence protocol sequence number plus one; and
setting the first reordering window length to a total reordering window length for the sequence of packets.

23. The method of claim 21, further comprising:
determining that the second packet data convergence protocol sequence number is not equal to the first packet data convergence protocol sequence number plus one; and
setting the first reordering window length to a reordering window length comprising packets from the sequence of packets associated with sequence numbers greater than the second packet data convergence protocol sequence number.

24. The method of claim 19, further comprising:
determining the third retransmission request time duration based at least in part on a first offset and a product of an integer and a hybrid automatic repeat request round trip time for the first connection, wherein the integer is associated with a level of the third retransmission request time duration, and wherein overriding the first retransmission request time duration with the third retransmission request time duration is based at least in part on determining the third retransmission request time duration.

25. The method of claim 19, further comprising:
determining the first threshold based at least in part on an available reordering window for the sequence of packets, a retransmission request processing duration, a hybrid automatic repeat request round trip time for the first connection, or a combined throughput for the first connection and the second connection, wherein determining that the first reordering window length satisfies the first threshold is based at least in part on determining the first threshold.

26. The method of claim 25, wherein determining the first threshold comprises:
determining the first threshold for a first data radio bearer of the first connection, wherein the first reordering window length corresponds to the first data radio bearer, and wherein the combined throughput is equal to a throughput for one or more data radio bearers for the first connection and the second connection that excludes a throughput for one or more second data radio bearers associated with an unacknowledged mode.

27. An apparatus for wireless communications at a user equipment (UE), comprising:
means for receiving, for a first connection, first control signaling indicating a first retransmission request time duration for requesting packet retransmission relative to when a packet in a first subset of a sequence of packets is determined to be unsuccessfully received via the first connection;
means for receiving, for a second connection, second control signaling indicating a second retransmission request time duration for requesting packet retransmission relative to when a packet in a second subset of the sequence of packets is determined to be unsuccessfully received via the second connection;

means for determining that a first reordering window length for the first subset of the sequence of packets satisfies a first threshold associated with the first connection; and means for transmitting, prior to expiration of the first retransmission request time duration, a first retransmission request to request retransmission of at least one packet in the first subset of the sequence of packets based at least in part on overriding the first retransmission request time duration with a third retransmission request time duration for the first connection, wherein overriding the first retransmission request time duration with the third retransmission request time duration is based at least in part on determining that the first reordering window length satisfies the first threshold, wherein the second retransmission request time duration is maintained for the second connection.

28. A non-transitory computer-readable medium storing code for wireless communications at a user equipment (UE), the code comprising instructions executable by a processor to:

receive, for a first connection, first control signaling indicating a first retransmission request time duration for requesting packet retransmission relative to when a packet in a first subset of a sequence of packets is determined to be unsuccessfully received via the first connection;

receive, for a second connection, second control signaling indicating a second retransmission request time duration for requesting packet retransmission relative to when a packet in a second subset of the sequence of packets is determined to be unsuccessfully received via the second connection;

determine that a first reordering window length for the first subset of the sequence of packets satisfies a first threshold associated with the first connection; and transmit, prior to expiration of the first retransmission request time duration, a first retransmission request to request retransmission of at least one packet in the first subset of the sequence of packets based at least in part on overriding the first retransmission request time duration with a third retransmission request time duration for the first connection, wherein overriding the first retransmission request time duration with the third retransmission request time duration is based at least in part on determining that the first reordering window length satisfies the first threshold, wherein the second retransmission request time duration is maintained for the second connection.

\* \* \* \* \*